(No Model.)　　　　　　　　　　　　　　　　　　9 Sheets—Sheet 1.
C. F. HINMAN.
GRADING AND DITCHING MACHINE.
No. 606,216.　　　　　　　　Patented June 28, 1898.
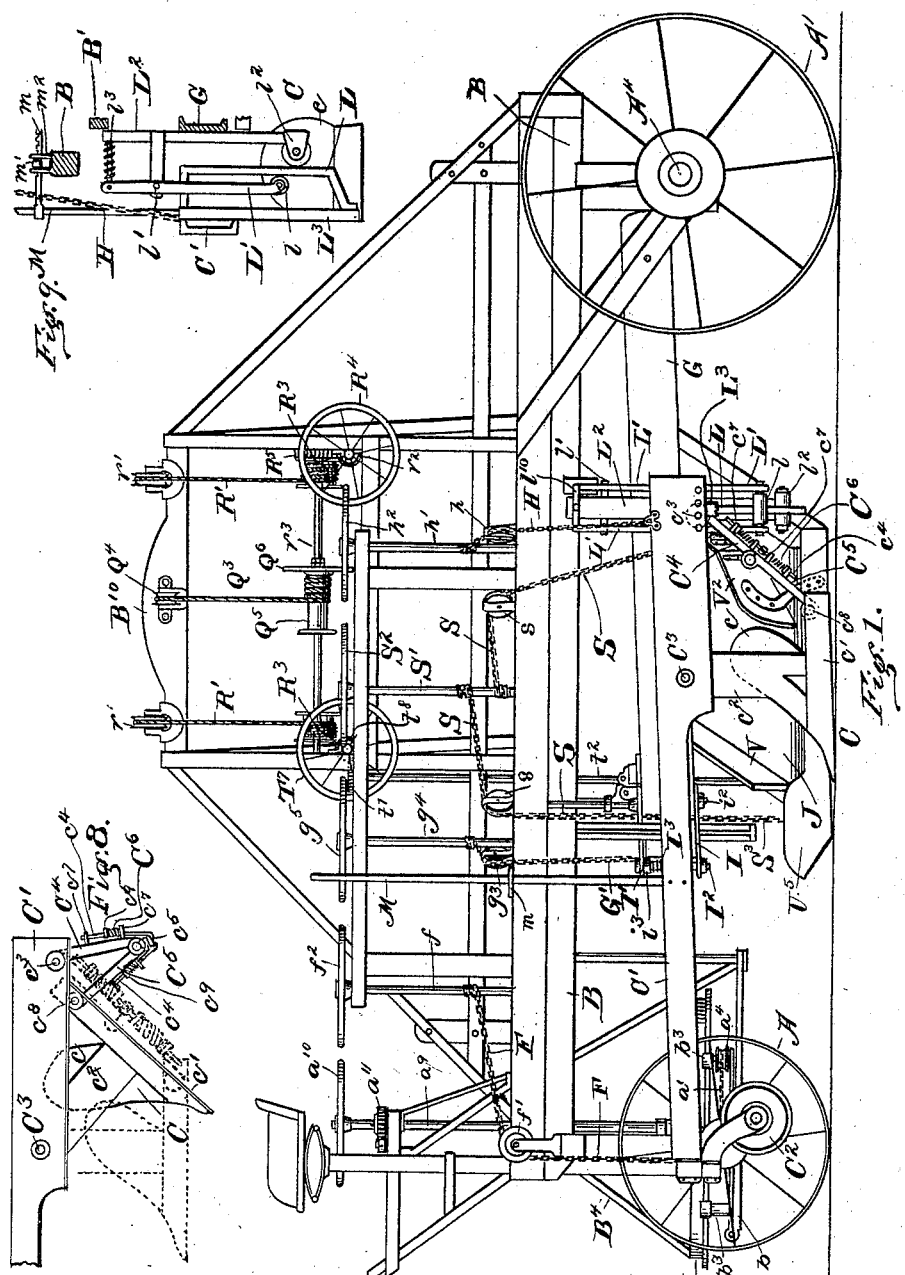
WITNESSES
Theo Hiller
Arthur L. Bryant
INVENTOR
Clement F. Hinman
By H. H. Bliss
Attorney

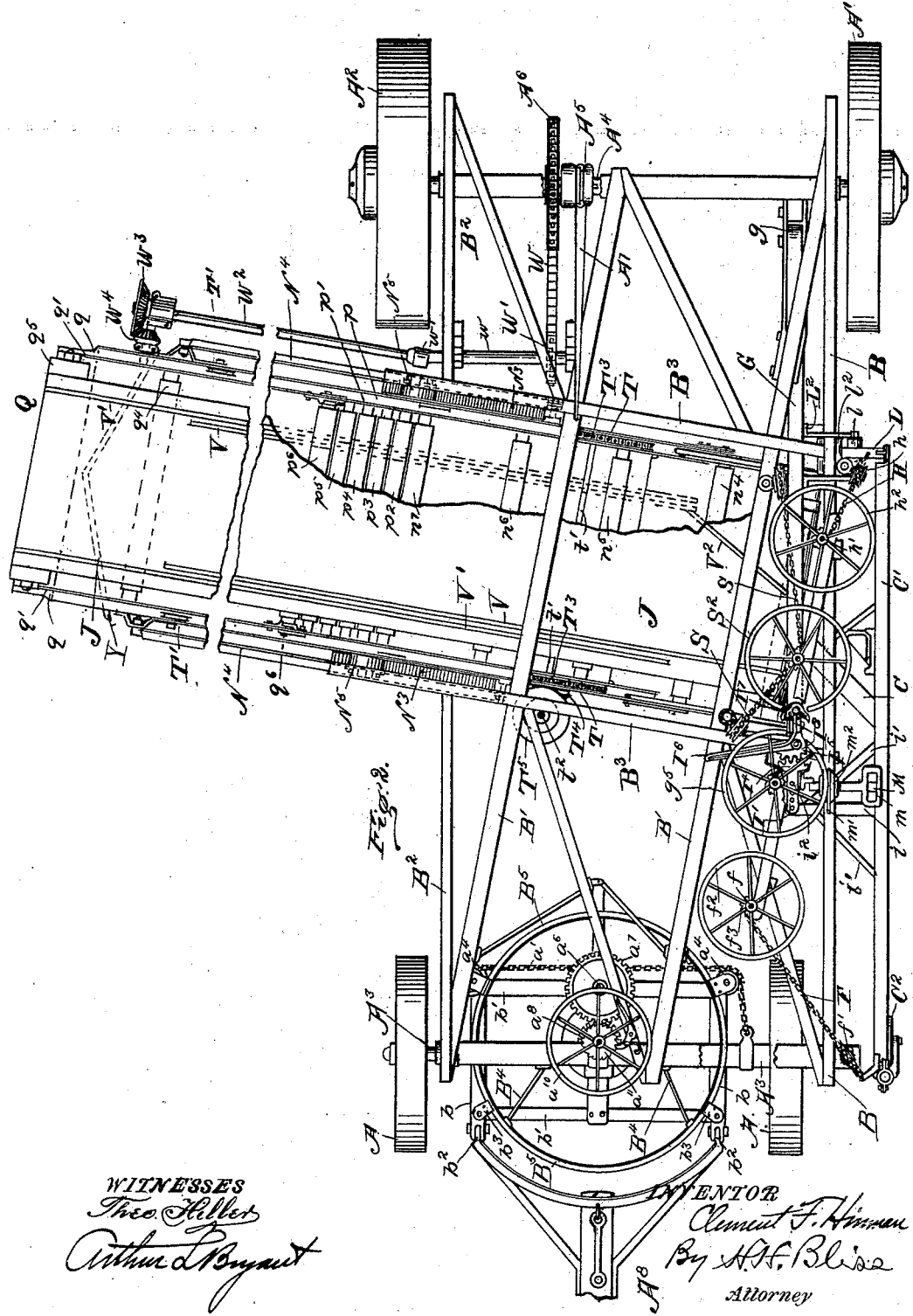

(No Model.) 9 Sheets—Sheet 3.
C. F. HINMAN.
GRADING AND DITCHING MACHINE.
No. 606,216. Patented June 28, 1898.
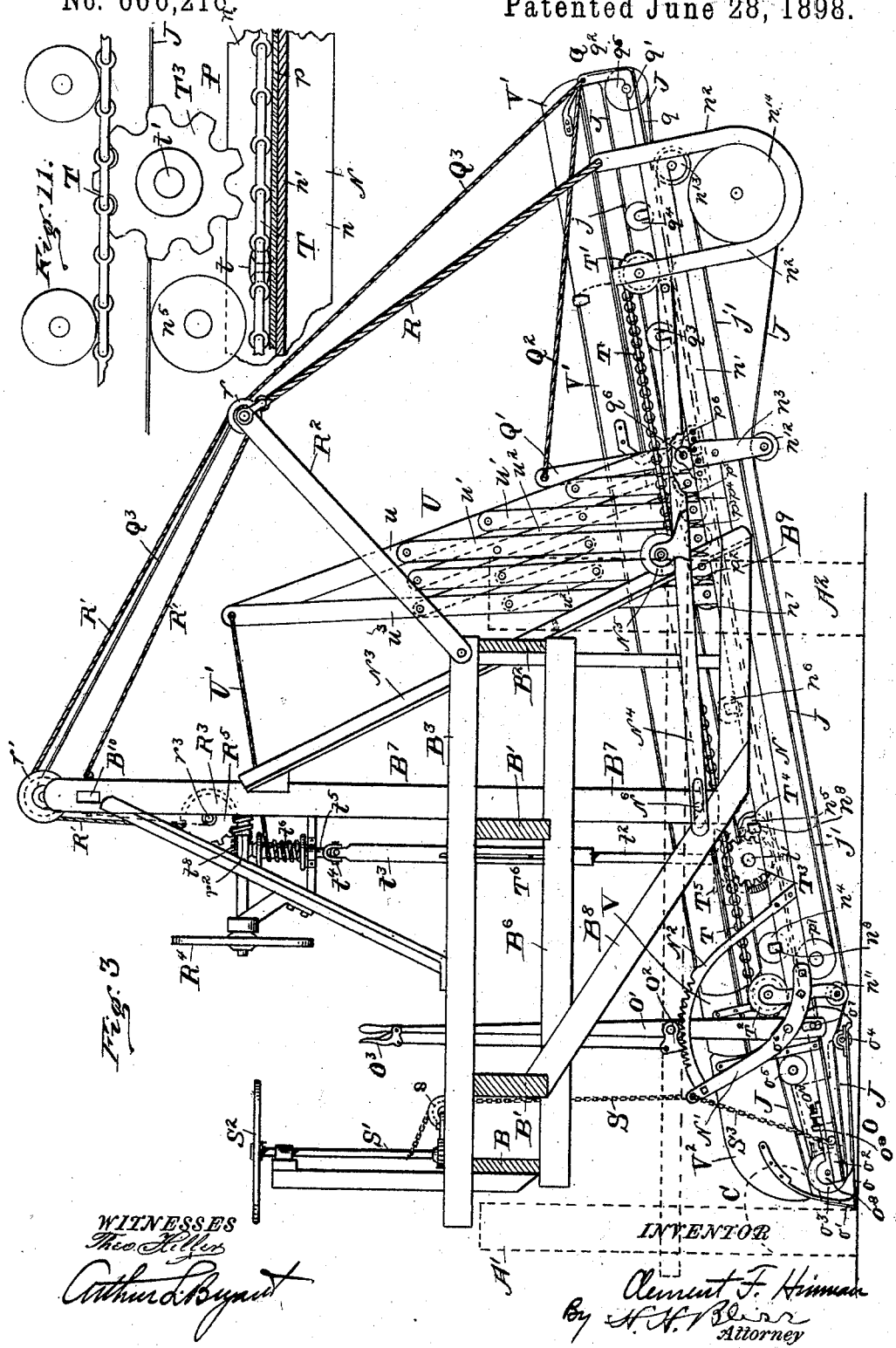
WITNESSES
INVENTOR
Clement F. Hinman

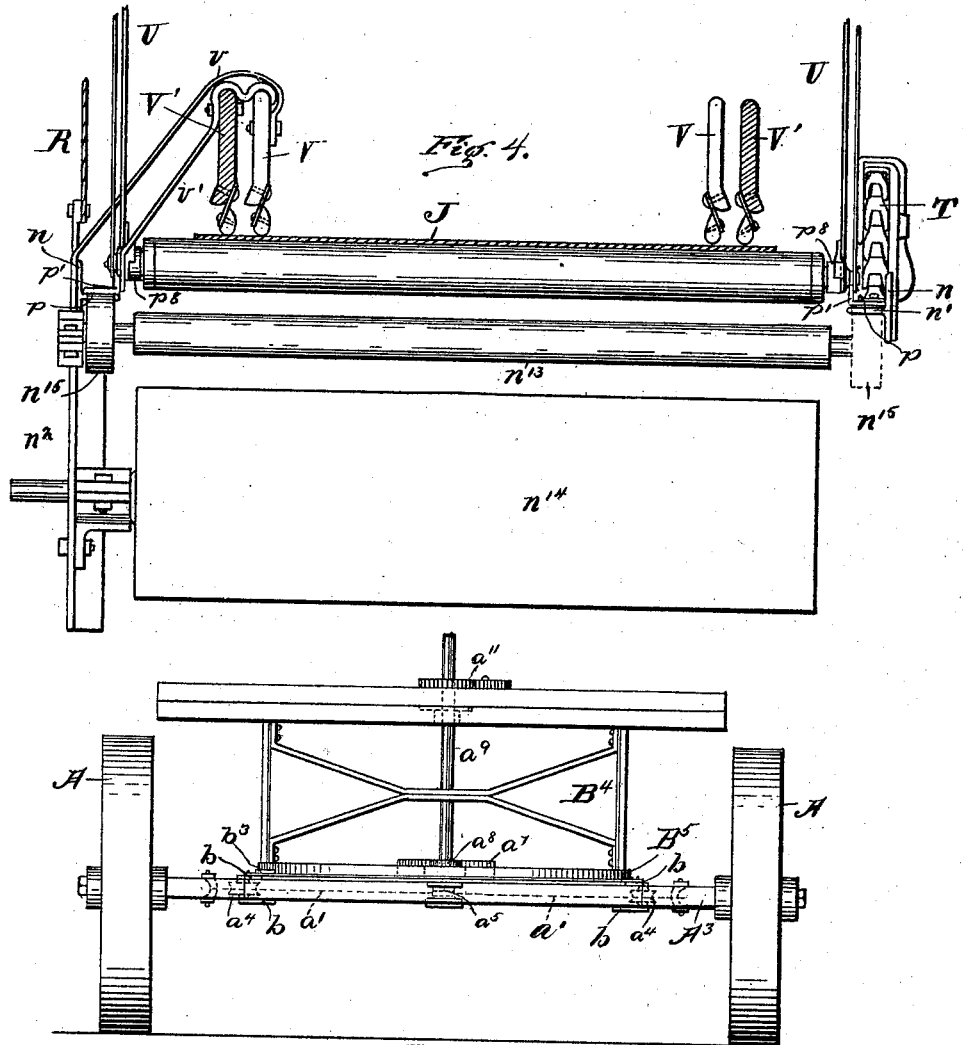

(No Model.) 9 Sheets—Sheet 5.

C. F. HINMAN.
GRADING AND DITCHING MACHINE.

No. 606,216. Patented June 28, 1898.

Witnesses:
H. W. Thayer.
Arthur L. Bryant.

Inventor:
Clement F. Hinman
By H. H. Bliss
Attorney.

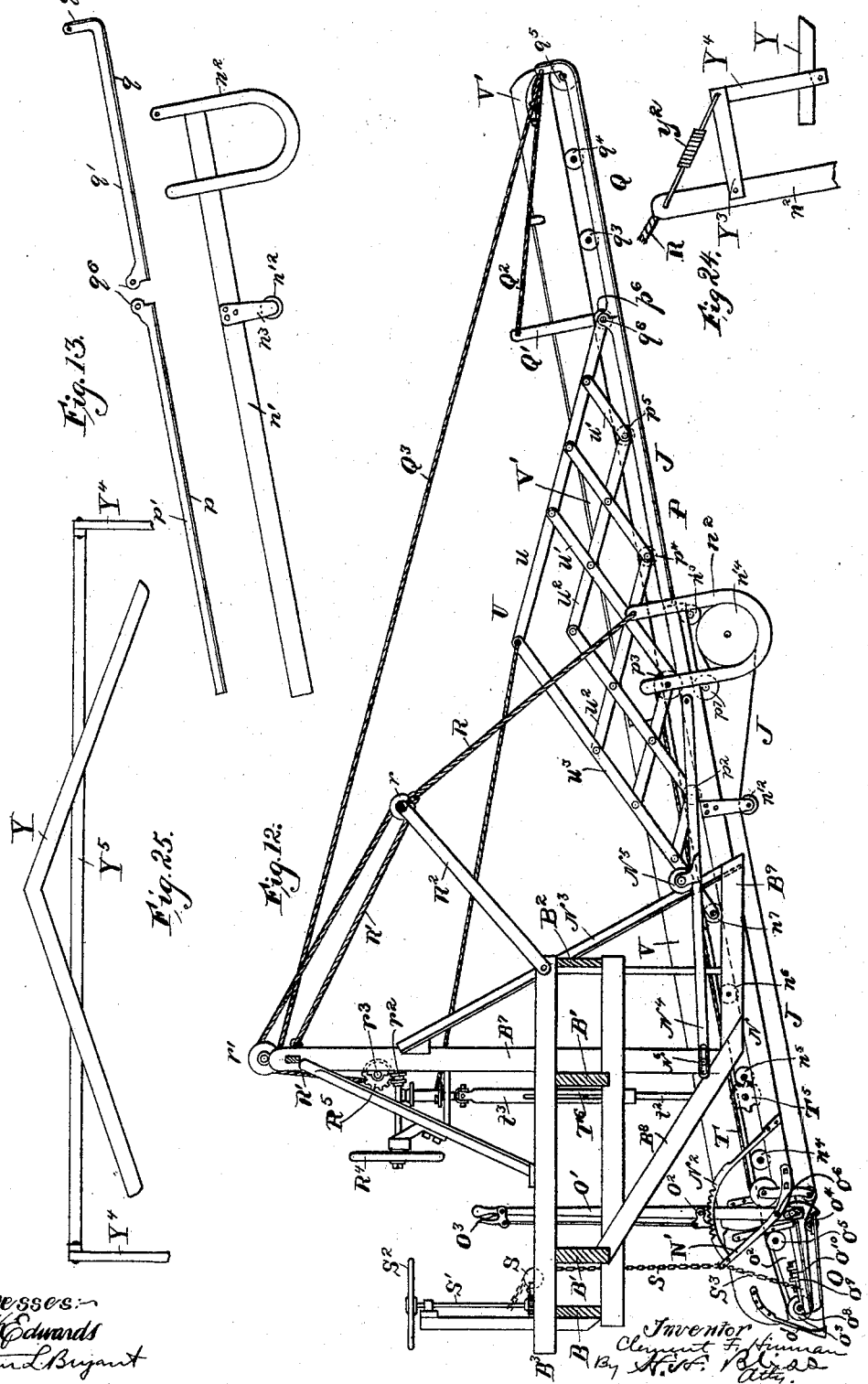

(No Model.) 9 Sheets—Sheet 7.
C. F. HINMAN.
GRADING AND DITCHING MACHINE.
No. 606,216. Patented June 28, 1898.
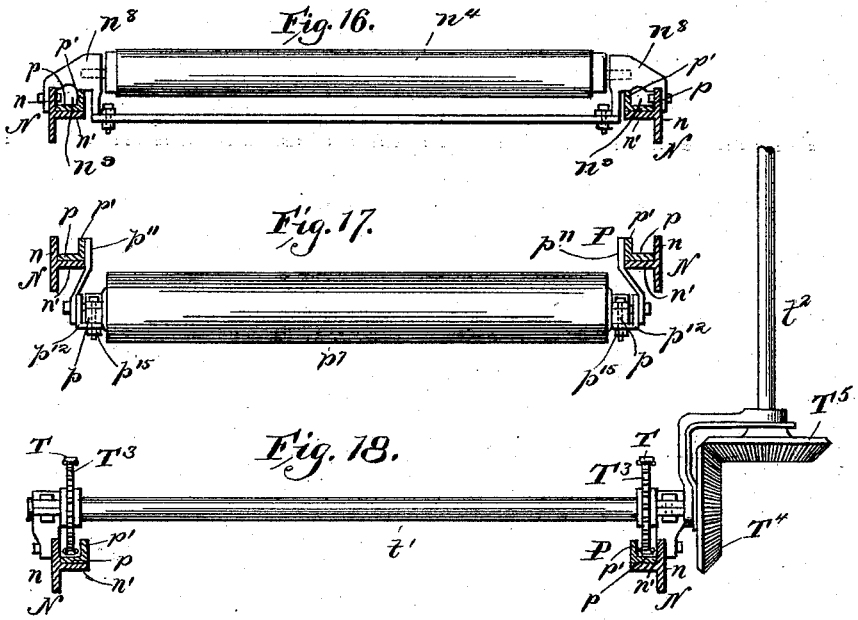
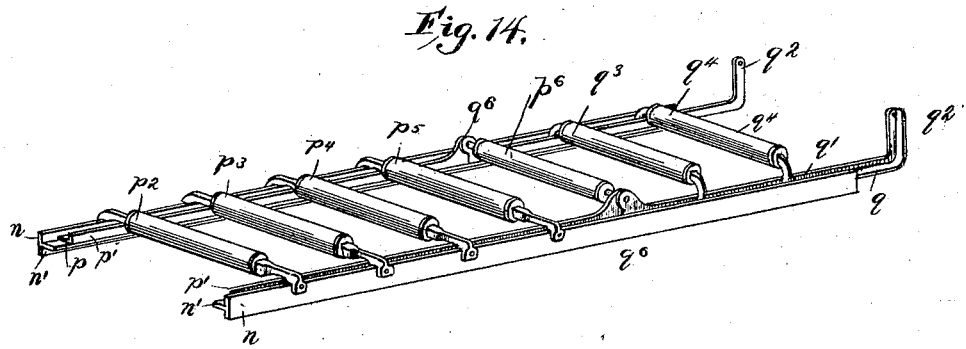

(No Model.) 9 Sheets—Sheet 8.
C. F. HINMAN.
GRADING AND DITCHING MACHINE.
No. 606,216. Patented June 28, 1898.
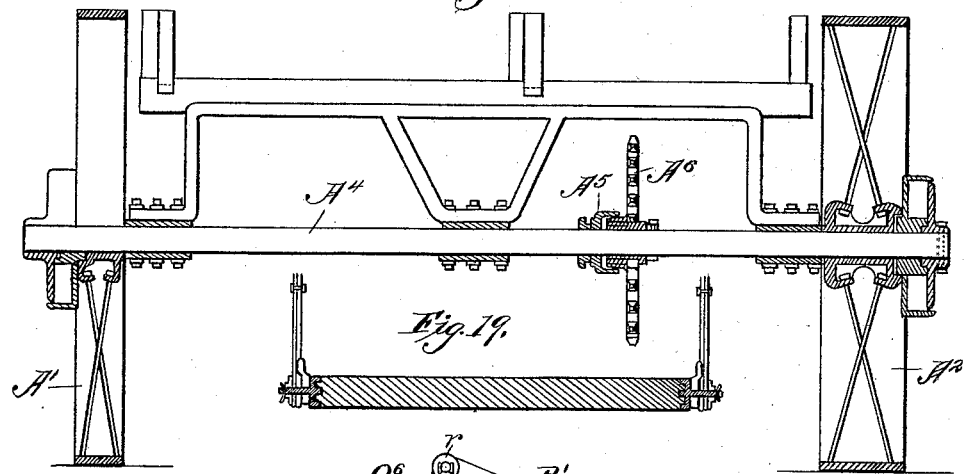
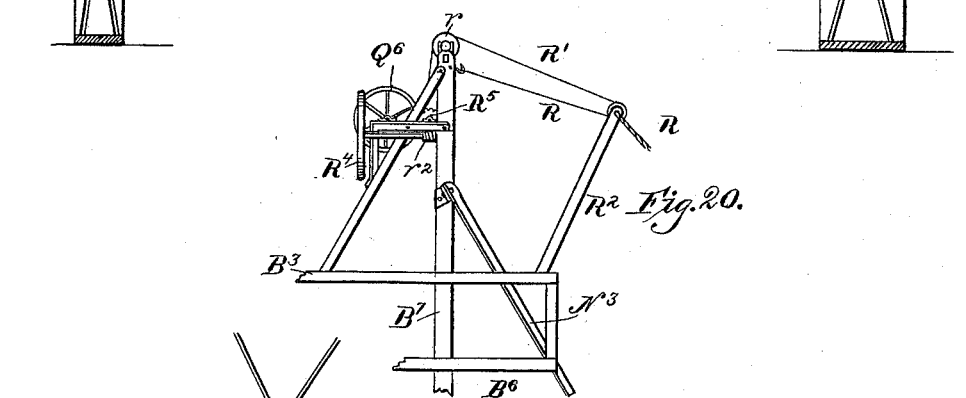
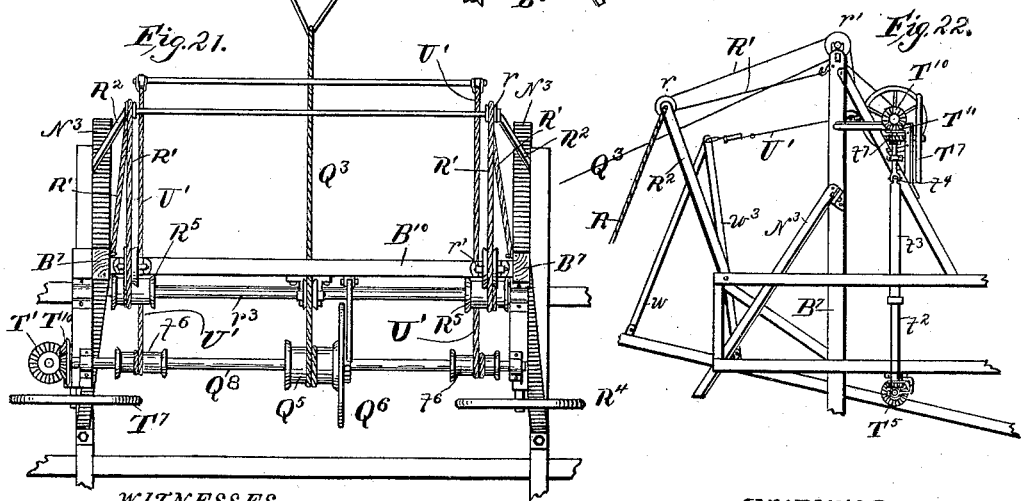
WITNESSES
Theo Hiller
Arthur L Bryant
INVENTOR
Clement F. Hinman
By H. H. Bliss
Attorney

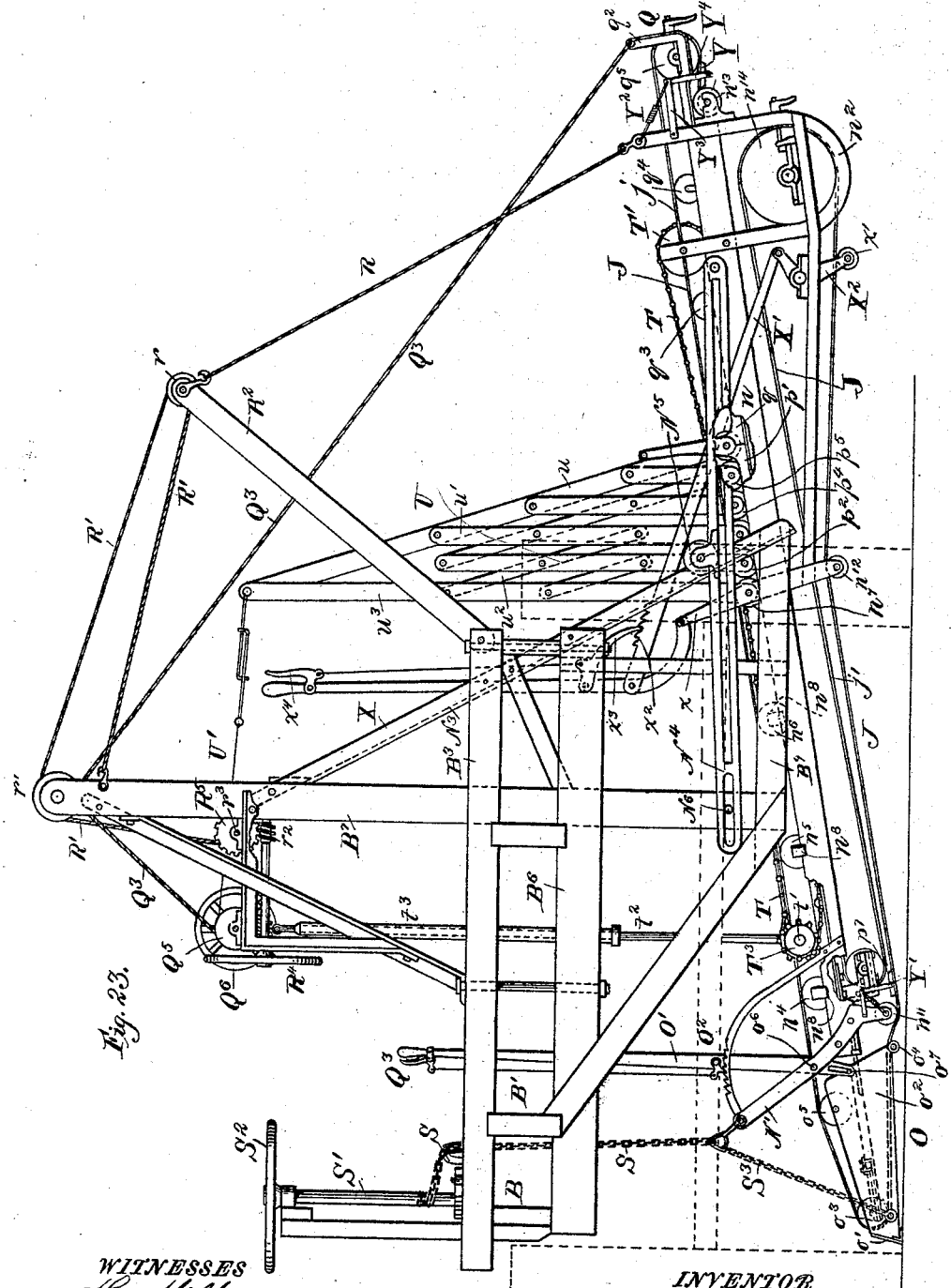

UNITED STATES PATENT OFFICE.

CLEMENT F. HINMAN, OF CHICAGO, ILLINOIS.

GRADING AND DITCHING MACHINE.

SPECIFICATION forming part of Letters Patent No. 606,216, dated June 28, 1898.

Application filed October 12, 1896. Serial No. 608,643. (No model.)

*To all whom it may concern:*

Be it known that I, CLEMENT F. HINMAN, a citizen of the United States, residing at Chicago, in the county of Cook and State of Illinois, have invented certain new and useful Improvements in Grading and Ditching Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 10:
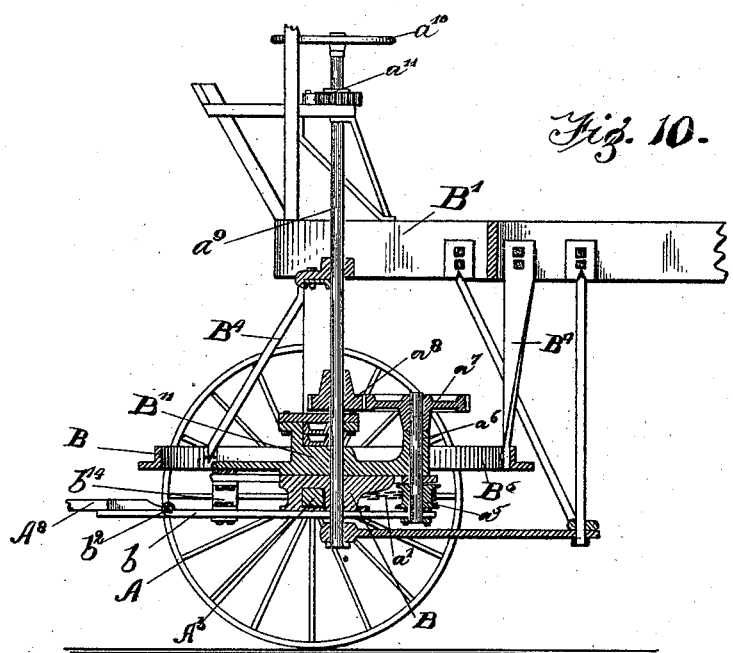
Figure 26:
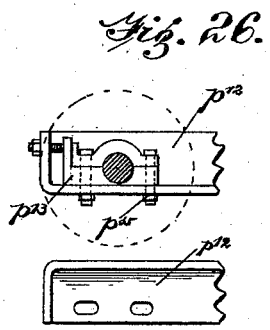

Figure 1 is a side elevation of a grading or ditching machine embodying my improvements, this figure showing the principal parts which would be seen from the left-hand side or the plow side, other parts situated at the opposite side of the machine being omitted to avoid confusion from a multiplicity of lines. Fig. 2 is a plan view of the machine, here also some of the parts being omitted, particularly some of the smaller details. Fig. 3 is a cross-section on a line parallel to the elevator, immediately in rear thereof, numerous parts being omitted from this figure also in order that the more important ones may be clearly presented. Fig. 4 is a section of the carrier or elevator and the parts adjacent thereto, taken on a line outside of the driving-drum. Fig. 5 shows detached and in rear elevation the front axle and the means for connecting it to the frame and for adjusting it. Fig. 6 is a section of part of the fifth-wheel, showing one of the bars of the hound-frame. Fig. 7 is a perspective of the locking device for the front-axle-adjusting mechanism. Fig. 8 is a side view of the plow detached, together with the adjacent parts. Fig. 9 is a cross-section of the supporting-beam for the plow and showing the means at the rear end of the plow-beam for connecting them together. Fig. 10 is a vertical sectional view through the fifth-wheel of the front axle and some of the devices for adjusting the axle. Fig. 11 shows part of the carrier-adjusting devices. Fig. 12 is a side elevation of the carrier when extended, the main frame being shown in section. Fig. 13 is a side view of the side parts of the main carrier-frame section and of the two sliding sections. Fig. 14 is a perspective to show the relations of the main carrier-section, the two sliding sections, and the rollers. Fig. 15 is a view, partly in rear elevation and partly in section, of the rear axle and the parts attached thereto. Fig. 16 shows one of the rollers on the main carrier-frame section and parts of the frame. Fig. 17 shows the suspended roller which supports the inner end of the inactive part of the belt. Fig. 18 is a cross-section of the carrier-frame, showing the manner of supporting and driving the chains which adjust the length of the carrier. Fig. 19 is a vertical section of a hanging roller and its support. Figs. 20, 21, and 22 show a slightly-modified arrangement of the parts which support and adjust the ropes by which the carrier is varied in its positions relatively to the main frame. Fig. 23 is a view corresponding to that in Fig. 3, except that some of the parts are slightly modified. Figs. 24 and 25 illustrate details of the scraper. Fig. 26 illustrates, in side elevation and plan, the device for supporting the roll $p^7$.

In the drawings, A A indicate the front wheels, and $A'$ $A^2$ the rear wheels, upon which the working parts of the mechanism are mounted and transported. The wheels are arranged relatively to each other as shown in Fig. 2, the rear wheels $A'$ $A^2$ being spaced considerably farther apart than the front ones A A and the rear wheel $A^2$ at the right-hand side having a much broader tread than its fellow and being arranged in or nearly in the same longitudinal lines as the right-hand front wheel A, whereas the other rear wheel $A'$ is placed to run on lines considerably farther out than the left-hand front wheel A, and the important advantages incident to this arrangement will be apparent from the description of the other parts given below.

$A^3$ indicates the front axle, and $A^4$ the rear axle. The latter is secured rigidly to the main frame of the machine; but the front axle is arranged, mounted, and connected to the other parts in a peculiar manner to which I have been led by a long experience with machines of this class and from an observation of the serious difficulties incident to those of the earlier sorts. In this machine the axle $A^3$ is pivoted to the front part of the framework of the machine, and it can be readily turned from or toward the line which is directly transverse to the normal longitudinal lines, and it is capable of such adjustment independently of the tongue and the connecting devices of the latter. The axle extends from side to side and lies above the lower bars $b\ b$ of the hound-frame, to which the tongue $A^8$ is pivoted at $b^2\ b^2$. The tongue and hound frame may be, if desired, connected to the main frame and constructed in the ordinary manner, they being adapted to have the horses turn them to the right or the left.

In the embodiment of my invention herein illustrated I have shown the hound-frame as consisting of two substantially rectangular-shaped frames arranged one above the other, the longitudinal braces $b$ of the lower frame being, as aforesaid, connected with the tongue. The top and bottom frames of the hounds are connected by suitable bars $b^{14}$, and between said frames are arranged two or more guide-pulleys $a^4$, for a purpose to be hereinafter described. The upper of said frames is provided with a casting $B^{11}$, which is connected with the main frame of the machine. The lower surface of this casting contacts with a casting $B^{12}$, with which the axle $A^3$ is directly connected, said castings $B^{11} B^{12}$ being loosely fitted about a vertical shaft $A^9$.

The main frame (composed of bars B B B' and others to be described) has at its front end a downward-extending frame consisting of bars $B^4\ B^4$, of suitable number and arrangement and terminating in a fifth-wheel or ring $B^5$. This ring or wheel is movably connected to the hound and tongue frame by clips $b^3\ b^3$, which engage with the horizontal flange of the ring. The ring lies above the axle $A^3$. The hound-frame can be turned by the horses because of the loose or slipping connection of the clips $b^3$ on the ring; but the axle lying between the ring and the hounds can vibrate independently of either and be moved as follows:

$a'$ is a chain or equivalent, having its ends secured to the axle at points inside the wheels A and passing over the aforesaid guide-pulleys $a^4$ and around a winding-drum $a^5$, mounted on a shaft $a^6$, which is journaled in bearings in the hound-frame and in the aforesaid casting $B^{11}$. The shaft $a^6$ carries a gear-wheel $a^7$. With wheel $a^7$ engages a pinion $a^8$, carried by the vertical shaft $a^9$, which extends up to a point within easy reach of the operator and carries a hand-wheel $a^{10}$ and locking devices at $a^{11}$. The operator can at any instant quickly change the direction of the machine by turning the hand-wheel $a^{10}$ and thereby drawing upon the axle through one end of the chain, as the desired direction may require.

Heretofore machines of this class have been so constructed that dependence must be placed entirely upon the horses to govern the direction of advance; but as the machines are very heavy and cumbersome, and as an appreciable period of time is necessary to get the horses all turned into a new direction it has been impossible to attain the accuracy which has been desired. The direction of travel of the plow and the character and amount of its work depend intimately upon the direction of travel of the machine, and changed conditions for the plow suddenly met, such as the increase in the depth of the cut or a change in the character of the soil, demand that it (the plow) should be given a new direction for a longer or shorter period of time, very frequently for a short distance. It is not only a tedious and difficult matter but often quite impossible with the machines as heretofore constructed to thus quickly modify the path of the plow; but by having the front axle movable independently of the frame and of the draft devices the operator can within a few feet of distance so change its path that all of the ordinary requirements are fully met.

The main frame, already referred to, may be constructed of any suitable parts. The one illustrated consists principally of longitudinal sills $B\ B^2$, diagonal sills B', and a requisite number of cross-girths. The framework is so arranged as to provide a large slot or cut-away portion on the right-hand side, opposite to the plow, and situated on lines which are inclined backward somewhat, and the whole of it as near as possible to the right-hand rear wheel $A^2$. To provide such an open space the side sills $B^2$ can be sectional, as shown in Fig. 2, and the frame can be suitably strengthened by supplemental cross-girths, as at $B^3\ B^6$, (see Fig. 3,) with vertical posts or uprights $B^7$ and inclined braces $B^8$, with bottom bars $B^9$, there being one set of each of these frame parts $B^3\ B^6\ B^7\ B^8\ B^9$ on each side of the aforesaid transversely-arranged open space.

The plow is arranged on the left-hand side of the machine, it being represented as a whole by C and having the moldboard $c$, the landside $c'$, and the standard $c^2$, connecting it to the beam C'. The plow is pivoted to the beam at $C^3$ and is adapted to escape from the ground in case of its striking against severe obstructions. This is permitted as follows:

$C^4\ C^5$ are arms or bars pivoted together, and the bars $C^4$ being pivoted to the beam C' and the part $C^5$ being pivoted at $c^8$ to the plow, said bars or arms constituting a toggle-like holder for the plow, as shown in Fig. 1, and adapted to nearly but not quite positively lock the plow from turning backward on its hinge at $C^3$. The parts of the holder are held in a locked position by means of springs $C^6\ C^6$, one or more. As shown, these springs are supported by rods $c^4\ c^4$, hinged together at their ends and arranged to slide in guide-ears $c^7$ on the holder-arms $C^4\ C^5$, the springs bearing in one direction against the guide-lugs and in the opposite direction against nuts or adjustable stops $c^9$. The springs by their compression, which can be regulated, tend to hold the locking toggle-bars in their normal position, as shown in Fig. 1; but in case an obstruction should be met, causing a back pressure greater than is desirable, the force will break or open the lock against the tension of the springs, the arms C⁴ C⁵ will swing upward into the position shown by full lines in Fig. 8, and the share escape from the ground or swing back far enough to ride over the obstruction, after which the force of the springs will again tend to draw the bars C⁴ and C⁵ into line and automatically force the plow back to its operative position.

The plow-beam C' is supported flexibly or freely from the main frame by means of the chains F and H. The chain F is connected to the front end of the beam, and passes thence up over a guide-sheave $f'$ to a vertical winding-shaft $f$, having a hand-wheel $f^2$. Similarly the chain H is attached to the rear end of the beam and passes thence over a guide-sheave $h$ to the winding-shaft $h'$, with hand-wheel $h^2$. At the front end the plow-beam is provided with a freely-swinging caster-wheel C².

The power is transmitted to the plow in a peculiar manner. Heretofore the draft has been applied to the plow-beam by means of bars, chains, or like parts, or different combinations thereof, connected comparatively directly to the draft devices at the front end of the machine and interposed between them and the front part of the plow-beam. The result when in operation is that a side draft or torsional draft is experienced, which I have succeeded in obviating. The part which directly transmits the force to the plow in my machine is a swinging beam G, which is pivotally connected to the rear axle or to the main frame at a point relatively near said axle, and which is capable of free vertical vibration within limits, and which serves to push the plow from the rear left-hand corner of the machine. The line along which the force is to be conceived of as being exerted upon the plow is one, therefore, much more nearly parallel to the longitudinal lines of the machine than is the case with the earlier mechanisms in which a pull was exerted on almost directly transverse lines from the draft devices to the beam. This push-beam G is connected to the plow by two sets of devices, as follows: I I' are bars, one below and the other above the beam G and secured thereto by a common pivot $i^2$. I² is a pin or bolt connecting these bars I I', the three together constituting, substantially, a clevis. The plow-beam has an inward-projecting arm $i$, held by braces $i'$, and this arm is hinged on the said bolt or clevis-pin I². The connection of the plow-beam through its arm I is such as to permit vertical play independently of the push-beam G; but in order to hold the plow properly down to its work I prefer to employ a spring, as at I³, bearing downward on the connecting-arm $i$ and upward against an adjustable abutment $i^3$. It will thus be seen that while a constant pushing force is being exerted upon the plow-beam the latter can rise and fall more or less independently of the beam G, either automatically, as when the plow is in operation, or when a lifting action is exerted on the chain H or chain F, or both, and also that when the lifting action of the chains has passed a certain limit they will not only elevate the plow-beam, but also the push-beam G.

The other set of devices for connecting the plow-beam C' to the push-beam G are arranged just behind the plow C. They consist, mainly, of a vertical bar L, (see Fig. 9,) a swinging or yielding bar L', and a stop or abutment opposite to this bar L'. Preferably I secure a bar L³ to the plow-beam C' for supporting the bar L at its upper and lower ends, these bars being a suitable distance from each other, as shown in Fig. 9. To the push-beam G, I secure a vertical bar L², which carries the bars L', the latter being pivoted at $l'$. The bar L² also is provided with an abutment, preferably a roller $l^2$, against which the aforesaid bar L on the plow-beam bears. The bars L' have an opposing abutment, such as the roller $l$, situated on the opposite side of the bar L from the roller $l^2$, and they extend above the pivot $l'$ and are connected by a cross-bar $l^{10}$, a spring $l^3$ being interposed between said cross-bar $l^{10}$ and the bar L². It will now be seen that the devices just described act to hold the plow-beam at its rear end inward, or in normal position in relation to the push-beam G, but that this is done in such way that the plow-beam can rise and fall more or less independently of the beam and of the bars L' and L², and it will also be seen that the holder or lock thus provided is adapted to yield or open to permit the plow-beam to swing laterally or outward away from the beam G. The rollers or abutments $l\ l^2$ are placed nearly opposite to each other, and the spring $l^3$ is of such nature, force, and arrangement that it will prevent the bar L' from swinging out so long as only an ordinary lateral force is being exerted upon the plow-share; but if the oblique share of the plow should strike any obstruction or undue resistance, acting upon it laterally, the spring at $l^3$ is adapted to yield and permit the plow to move outward and escape the obstruction or resisting material; but the parts are so formed and related that it cannot at any time entirely escape from the push-beam G and is ordinarily held with sufficient rigidity with relation thereto and when forced away will automatically return to its proper position. And, again, the devices just described permit another important matter, as follows: M is a lever having its lower end rigidly secured to the plow-beam C' and extending up to a point where it can be conveniently reached by the operator. He, while standing on his platform, can by this lever M tilt the plow-beam and plow sidewise in either direction, as occasion may demand. Such tilting is an oscillation of the share and beam around the lower edge of the landside as an axis; and by having the two bearing-points, as $l$ $l^2$, of the lock or holding device at a low line they do not oppose the free tilting of the plow through the lever M, although they continuously hold it relatively to the beam G. The lever M passes loosely through a holder $m$, having a slotted head and a ratcheted or toothed shank, the latter passing through a guide $m^2$ on the main frame. This holder can be locked in either of several positions by means of a latch-piece $m'$, which the operator can move with his foot.

It is well known that when using a plow for upturning or loosening earth it is impossible to obtain the best results by having the plow held in a fixed position, and even with the ordinary implements the plowman is compelled to employ the handles for constantly changing the positions of the share in order to adjust its face, so as to meet the rapidly-varying conditions; and the same necessity has been unavoidably met with in machines of the class of the present one, wherein similarly-acting plows are connected to propelling vehicle-frames, and in the earlier machines of this sort attempts have been made to provide for such changes; but in no machine within my knowledge has use been made of means such as I have devised for permitting the lateral motions of the plow bodily, the vertical adjustments of either end independently or both ends simultaneously, a brief tilting of the share back and forth, or the throwing of it into a new inclined position and locking it there, and which means were all automatic in their operation or could be actuated by the operator while standing upon the machine or while the machine was in motion. In the earlier mechanisms devices were employed for holding the plow in either of several positions after tilting it; but in each case they required the stoppage of the machine, the removal of bolts or the like, a tedious shifting of the holders of one sort or another, and a rebolting or equivalent operation.

With the present machine the plow can be manipulated while in motion in all of the ways substantially that can be followed by the plowman with an ordinary plow.

The earth which is loosened and turned upward by the share C is delivered to a carrier which takes it toward and beyond the opposite side of the machine and is delivered at the point desired. The carrier, its supporting devices, and the means for adjusting it, for driving it, and for varying its length are constructed and arranged as follows: The carrier-frame may be considered as composed of four sections, respectively indicated each as a whole by N, O, P, and Q. The main section N is formed with two side bars of T-shaped angle-irons, the vertical flanges being indicated by $n$ and the horizontal flange by $n'$. These side bars are connected by crossbars of any suitable number and sort. From these bars there extend vertical arms or bars $n^2$ $n^3$, adapted to support rollers for carrying the belt, the latter being indicated by J. The loaded part of the belt J rests upon and travels over a series of rollers, some of which are supported upon these bars $n$ $n'$ of the main section N, said rollers being indicated by $n^4$ $n^5 n^6 n^7$. They are mounted in bearings which are rigidly fixed to the said side bars, these bearings being indicated by $n^8$, they being castings which are bolted to the side flange of the angle-iron bars of the section N and extend inward over the upper edges of said side flanges and are arranged to provide an open unobstructed space at $n^9$ between the bearing-pieces $n^8$ and the horizontal flanges $n'$. (See Fig. 16.) This section N of the carrier-frame also supports rollers at $n^{11}$ and $n^{12}$ for the lower or inactive part of the traveling belt J, a roller at $n^{13}$ for receiving and guiding the belt immediately after it begins to return at the outer end, and a driving roller or drum at $n^{14}$.

The section O of the carrier is the lowermost and the one nearest to the plow. It has a framing or boxing comprising a bottom $o$, an end plate $o'$, and side parts $o^2$, and upon its framing are supported the rolls $o^3$ $o^5$ under the receiving part of the belt J and the idler or guiding-roll at $o^4$ for the under part of the belt. This section O of the carrier is loosely connected to the section N for the purpose of increasing or decreasing the speed of travel of the belt at either side. The joining devices between the sections O and N are such that the section O can at one side or the other be slipped somewhat from or toward the section N. It frequently happens that from changes in temperature, humidity, &c., one side of the belt is found to be traveling faster than the other, with the result that the belt tends to "climb" or move bodily in one direction or the other transversely of itself and longitudinally as to the axis of the rollers. I overcome this difficulty by providing means for throwing the rollers $o^3$ and $o^5$ from one position to another, so that the belt will be guided in such manner as to counteract its tendency to travel toward one side.

O' is a lever extending from a point within reach of the operator down to points near the junctions of the sections N and O of the carrier and outside thereof. It is pivoted at $o^6$ to the section N or an arm carried thereby and to the section O by a pin at $o^7$, fitted in a slot in the lever. When the lever is moved in one direction, the rollers $o^3$ $o^5$ will be so shifted as to tend to cause the belt to move laterally in one direction, and vice versa. The lever can be locked in any desired position by a pawl $O^2$, operated by a thumb-latch $O^3$ at the end of the lever. It will be understood that there is one of these levers with the described connections on each side of the carrier, so that the rollers $o^3$ and $o^5$ can have either end properly adjusted. These sections N and O of the carrier are supported vertically as follows: R is a rope, chain, or rod connected to the outer end of the section N and extending up to bars or a frame $R^2$, there being one of these ropes on each side of the carrier. The boom-pieces $R^2$ are pivoted to the main frame and can be swung up or down by means of the ropes $R'$. Each of the latter has one end fixed to the main frame and passes then around a pulley $r$ on the frame $R^2$ and thence back to a pulley $r'$ and down to a winding-drum $R^3$. The drums $R^3$ are on a shaft $r^3$, which can be rotated by means of the worm-wheel $R^5$ and the worm $r^2$ actuated by hand-wheel $R^4$.

The opposite or lower end of the main section N is supported on each side by means of a rope or chain S, which is secured to one or more projecting and bracing bars $N'$ $N^2$, said ropes S passing up over guide-pulleys $s$ to a winding-shaft $S'$, having a hand-wheel $S^2$. These ropes S and R furnish nearly all of the vertical support for the carrier, I avoiding the use of the fixed pivots or equivalent supports which have been heretofore employed. To prevent the carrier from undue swinging and to receive the back or downward pressure, I employ track-bars $N^3$, against which the carrier can bear as it moves vertically, interposing rollers $N^5$ between the section N and these tracks or abutment-bars $N^3$. These bars are supported at their lower ends by means of the above-mentioned frame-bars $B^8$ $B^9$. The rollers $N^5$ are each carried by bars $N^4$, which at their forward ends are pivoted to the main side rails of the carrier-section N and at their inner ends are slotted and have sliding connection with the guiding stay-pins $N^6$ on the main frame. A supporting mechanism of this character enables me to project the carrier to points remote from the frame without severely increasing the leverage on the latter.

The bottom section O of the carrier has its lower end supported by chains $S^3$, which are also fastened to the bars $N'$. When upward draft is exerted on the chains or ropes R S, both ends of the entire carrier will be lifted.

The third and fourth sections P and Q of the carier are movable longitudinally of the section N, so that the carrying part of the belt J can be elongated without requiring its total length to be extended by the insertion of supplemental pieces.

The section P has two principal side pieces, preferably formed of L-shaped angle-irons, the horizontal flange being indicated by $p$ and the vertical by $p'$. These are fitted to and can slide along the flanges $n'$ of the main section N. This section P is supplied with an upper series of rollers, which assist in supporting the loaded part of the belt J, they being indicated by $p^2$, $p^3$, $p^4$, $p^5$, and $p^6$, and also carries below the said series a take-up roller $p^7$ for supporting the lower or inactive part of the belt. Of the upper rollers only one—that at $p^6$—is fixed in relation to this carrier-section P, it being mounted in bearings at $q^6$, which are rigidly secured to the side bars $p$ $p'$. The other rollers of this series $p^2$, $p^3$, $p^4$, and $p^5$ are supported on and held by this section P, but are capable of longitudinal movement in relation to it. Each roller is at the ends fitted to bearings $p^8$, which rest upon the upturned flange $p'$ of the side bars, said bearings having grooves for the edges of the flanges or being otherwise fitted thereto, so that the flanges can slide through the bearings while maintaining engagement therewith. The take-up roll $p^7$ is supported below the lower ends of the side bars $p$ $p'$ of the section P.

$p^{11}$ are hanger-arms bolted to the flanges $p'$ and extending down a suitable distance to points where they are secured to the supporting-pieces $p^{12}$. On the latter rest the bearing-blocks $p^{13}$, in which the shaft of the roller $p^7$ is mounted. This bearing $p^{13}$ is adjustable along the support $p^{12}$, there being an adjusting-screw at $p^{17}$ for moving it in either direction and bolts at $p^{15}$ in slots $p^{16}$ for fastening the bearing after adjustment. By these devices the slack in the belt can be taken up, and particularly that part of it which is below the load-carrying portion and is inactive can be kept properly taut.

When the several sections of the carrier are in their closed position, as in Fig. 3, the side bars of the section P rest throughout their length on the flanges $n'$ of the side bars of section N, the overhanging bearings $n^8$ of the rollers $n^4$ $n^5$ $n^6$ $n^7$ allowing the side bars $p$ $p'$ to move freely under them through the aforesaid open spaces $n^9$. At such times— that is, when the parts are closed together, as in Fig. 3—all of the upper rollers carried by the section P are at the outer ends of the bars $p$ $p'$ and adjacent to each other.

The fourth section Q of the carrier is connected to and slides with the section P and is generally similar to it, except that its rollers are fixed in position and that it is capable of vertical swinging independently of the rest of the carrier. This section Q also has side bars, each with a horizontal flange $q$ and a vertical flange $q'$, turned up at their outer ends to form the extensions $q^2$. These side bars $q$ $q'$ are at $q^6$ pivoted to the side bars $p$ $p'$ of the section P; but ordinarily they, like the side bars of the section P, rest upon the flanges $n'$ of the section N, the side bars of these two sections P and Q being practically extensions one of the other. The rollers carried by the section Q are indicated by $q^3$ $q^4$ $q^5$, each being fixed in bearings secured to the side bars $q$ $q'$, and that at $q^5$ being at the place of final delivery from the carrier.

Now the devices for causing the elongation of the carrier-frame—that is, causing the sections P and Q to move longitudinally outward along the section N—are as follows: T is a chain, there being preferably one on each side of the carrier. This chain is supported on the wheels $T'$ and $T^2$, which wheels are mounted on brackets attached to the main carrier-section N. The chain is at $t$ fastened to the flange $p$ of the side bars of the section P.

$T^3$ $T^3$ are sprocket-wheels which engage with the chains T, these wheels being secured to a shaft $t'$, arranged transversely of the carrier and below the load-carrying part. At one end this shaft is provided with a bevel-wheel $T^4$, engaging with a driving-wheel $T^5$. The latter is secured to a shaft $t^2$, which is telescopically connected to a shaft-section $T^6$, the upper portion $t^3$ of which is joined to a shaft $t^5$ by a universal coupling at $t^4$. At the upper end of shaft $t^5$ there is a worm-wheel $t^7$. With the latter engages a worm $t^8$, the shaft of which carries the hand-wheel $T^7$. When the operator rotates this hand-wheel, it results in rotating the sprocket-wheels $T^3$, and when such rotation is in one direction the chain T is moved in such way as to compel the section P of the carrier to move outward and to carry with it the outer section Q. During such outward movement of the sections P and Q the side bars $p$ $p'$ slide along the flange $n'$ and under the bearings of the rolls $n^4$, $n^5$, $n^6$, and $n^7$, fixed, as aforesaid, to the side bars of the section N. At the same time the series of rolls $p^2, p^3, p^4, p^5$, and $p^6$ are also moving outward, the last of the series at $p^6$ moving with the same speed and over the same distance as the section P, but the others in rear of this one at $p^6$ moving more slowly and over less distances. The travel of the rollers $p^2, p^3, p^4$, and $p^5$ is governed by a system of lazy-tong levers, (indicated as a whole by U.) It comprises the two principal outside levers $u$ $u^3$, shorter vertical levers $u'$ $u'$, and the connecting-links $u^2$. There is one of these systems of levers on each side of the carrier. The longer outer levers $u$ $u^3$ are pivoted together at their upper ends and one is pivoted at its lower end to the axis of the outer roller $n^7$ of the series on the main section N of the carrier, while the other is pivoted at the axis of the outer roller $p^6$ of the series on the sliding section P. Each of the vertical levers $u'$ is at its lower end pivoted at the axis of one of the intermediate sliding rollers, and the intermediate link-bars $u^2$ are so related and connected to the bars $u$ $u'$ that proper parallelism is maintained throughout the system of levers. When these parts are present, the lines of support for the load-carrying part of the belt J are distributed in such manner that the belt and its load are properly supported, and when the carrier is extended to the full limit the rollers of the entire series are so positioned that they are approximately uniformly spaced from that at $n^4$ to that at $q^5$.

The systems U of lazy-tong levers are at their upper ends connected by one or more ropes U' to one or more drums, such as that above described at $t^6$. This drum is rotated when the devices which elongate or shorten the carrier are in action, and the diameter of the drum is so related to the speed of the chain T that the upper ends of the lever system U are let out or taken in with a speed corresponding to that of the moving part of the carrier. The rope or ropes U' also assist in holding up the outer portion of the carrier when it is extended, for as the outer lever-bar $u$ advances to points farther and farther out the rope U' pulls from the point of attachment of this lever-bar to the carrier the inner lever-bar $u^3$, then acting as a strut, and as the point of attachment of the latter is fixed at a place inside of the side lines of the support on the ground much of the strain caused by the gravity of the outer end of the carrier is brought to bear at points within the area of the ground-support.

The outermost section Q moves out and in bodily with the section P, as above described. It can also be lifted up or lowered around the axis of roller $q^6$ by means of a rope $Q^3$, which extends upward to a sheave at $Q^4$ on the main frame and thence downward to a winding-drum $Q^5$, mounted on the aforesaid shaft $r^3$ and having a hand-wheel $Q^6$, together with suitable ratchet for locking it. By means of these devices the outer section Q can have its outer end elevated independently of the other sections of the carrier, so it can be caused to deliver the earth at different points vertically, as may be desired. This outermost section Q has a supplemental support or check provided against its dropping below its normal line or being strained downward, this being in the present construction one or more ropes $Q^2$, extending upward and inward to standards Q'.

The carrier-belt J is arranged to have what I herein term an "active" or "load-supporting" part (indicated by $j$) and also have what I term an "inactive" part. Of course all endless carrier-belts have a forward or advancing part which is active and supports the load extending from one extreme roller to the roller at the other extreme and a returning portion going in the opposite direction from the latter roller to the first; but ordinarily this returning part of a belt is for purposes of economy and simplicity of structure arranged to be as taut as possible and to travel on as direct lines between the rollers as possible; but in the present case there is distinct provision made of an appreciable amount of a slack portion of the belt which can be utilized for elongating the active or load-carrying portion, and for many purposes of the present invention I regard any of such appreciable "slack" portion as being what I herein term the "inactive" portion of the belt. Where I desire to use a comparatively extensive portion of the belt for this purpose, I prefer to arrange this inactive part as indicated at $j'$—that is to say, so that it travels outwardly approximately in parallelism to the active part at $j$—but in this respect there can be variation without departing from the spirit of the invention.

I am aware of the fact that machines have been heretofore proposed each to have a carrier-belt having an upper or active portion and a returning portion as taut as is possible, practically, and to have combined therewith devices for slightly elongating the total frame for the mere purpose of taking up any slack in the belt that may result from straining in use or from changes in temperature, humidity, &c., such proposed machines being illustrated in earlier patents—as, for instance, in Patent No. 110,759 to Gillmore and Forrest, dated January 3, 1871, in which case it was necessary to stop the machine, pass to the outer end of the carrier, and adjust the outermost roller by racks and pinions after loosening the set-screws or bolts; also, in Patent No. 62,171 to W. J. Wauchope, dated February 19, 1867, (Reissue No. 4,676, dated December 12, 1871,) and Patent No. 394,908 to M. G. Bunnel, dated December 18, 1888, in both of whose constructions the extreme outer roller and all of the outer delivering portion of the belt were longitudinally stationary, while the roller adjacent to the plow was adapted to be moved toward and from the plow for the purpose of tightening the belt; but I believe myself to be the first to have constructed a machine of this class with a carrier-belt and a frame or support therefor so arranged as to provide an appreciable amount of slack belting which could be used for an appreciable elongation of the active portion of the belt, so as to place the outer or delivery end of the active part at a distance varying from a few inches to many feet remote from the main frame. This operation of varying the length of the active part of the belt in my case is strongly in contradistinction from the mere tightening or loosening of the belt, or varying its tension as between the two extreme rollers, and is accomplished by a distinct set of devices. In my construction the tension of the belt is adjusted by shifting both ends of the lower roller $o^3$ adjacent to the plow, it being mounted in shifting bearings $o^8$, having slotted arms $o^9$, against which set-screws $o^{10}$ bear, this part of the apparatus being more or less similar, generally considered, to what is shown in the aforesaid patent, No. 110,759, to Gillmore and Forrest. I also believe myself to be the first to have constructed a machine of this sort with a carrier-belt and a frame or support therefor made in two sections, of which the main or inner one, as at N, is longitudinally stationary on the main frame, while the second or supplemental one, carrying the outermost belt-roller at the delivery part of the belt, is movable outwardly and has combined with it devices extending to the operator's platform on the main frame, whereby the operator can while the machine is in motion vary the position of the outermost roller by lengthening the carrier-frame, so as to be able to make an embankment of much greater width and height than can be made with any of the earlier mechanisms within my knowledge. The parts at $N^5$ and $N^3$ act as a thrust-bearing for the carrier upon or against the main frame, as the carrier tends to swing as a whole toward the main frame, which swinging is resisted by the thrust of the parts at $N^5$ pressing or bearing against the bar at $N^3$. I believe my construction to be peculiar in having this bearing arranged on lines between the main or inner longitudinally-stationary frame-section, the said section being projected to lines considerably outside of said bearings. The longitudinally-adjustable part of the carrier is arranged to slide across the vertical planes of this bearing, so that during a considerable part of the time the weight of the adjustable part, or much of it, is inside of the bearing, this part, which moves to the inside, also traveling across the vertical planes of those rollers which are supported on the main frame-section, as a result of which arrangement I am enabled to place in compact form the parts requisite for a very long carrier. This longitudinal adjustment of the frame-section and the active part of the belt is accomplished without affecting the "tension" of the belt as between the extremities of the active part.

The parts constituting the system U of levers, as above indicated, perform several functions more or less distinct. They act to properly move and space the intermediate series of rollers $p^2$, &c., to $p^6$, inclusive; but in this respect there can be variations, as these rollers can be moved by other means, or for that matter one or more rollers, stationary on one of the sections N or P, can be employed. Again, the levers at U can be utilized, as above indicated, for assisting in supporting the outwardly-projecting part of the carrier, for which function the lever or bar $u^3$ may be regarded as the principal element. It may be effective with any of several sorts of connecting devices interposed between it and the outward-projecting part of the carrier; but when the other levers or bars are used for modifying the positions of the rollers $p^2$, &c., I prefer to utilize them also as the means of such connection. The lever or bar $u^3$ acts as a cantaliver, having its point of thrust or bearing inside of the aforesaid thrust-bearing at $N^5$ between the entire carrier and the main frame and also, preferably, as above stated, inside of the extreme side lines of the ground-support.

By having a chain, such as that at T, and its driving mechanism arranged as shown and described I can not only move the adjustable part of the carrier-frame positively in one direction, but also move it positively in the other direction, this being in contradistinction to the earlier mechanisms, in which use was made of a section of a chain and a draft-link for the purpose of drawing the receiving end of the belt and its frame-section toward the plow only, but not available for positively moving them in the opposite direction.

By having the ground-wheels arranged in the way above described—that is, with the front and rear wheels A $A^2$ on the right hand or carrier side of the machine substantially in line with each other—I carry the base-line of support out beneath the carrier and sustain it more advantageously than is the case when the front wheel is placed on lines farther in from the rear wheel, and by having the left-hand rear wheel A' farther out than the corresponding front wheel A it can be advantageously placed with respect to the plow, and the front wheel can be arranged so as to maintain the desired relation to its fellow front wheel as to horizontal lines and permit the use of a relatively long plow-beam, which can swing in or out without interference from the front wheel.

The advantages incident to having the plow-beam connected to the main frame in the way shown and described—namely, through the medium of the longitudinally-arranged rising-and-falling push-beam—will be readily understood, though in this respect also there can be variation so far as concerns the devices incident to attaining the several movements of the plow and its beam by themselves considered. By having a push-beam of this character and a plow-beam connected thereto in such way that it can rise and fall independently thereof at either or both ends I am enabled to let the plow down to an unusual depth without seriously modifying the leverage brought to bear by the vehicle-frame in pushing it through the ground, and at the same time permit the plow to move at such lower depths in the same relations to longitudinal horizontal lines in which it moves when higher up.

For holding the rear end of the plow against lateral displacement the spring $l^3$ is of great advantage, whether applied in precisely the way illustrated or in a modified manner. The holder roll or abutment $l$ may be applied in modified ways, as will be readily understood, though it is preferable that it should be arranged on longitudinal lines of the plow, so that the latter can be tilted without serious resistance from this abutment. The form of holder which I have shown may be considered as made of two parts, one member of which is the plow-beam or a bar or plate secured thereto and the other member of which is a device connected directly or indirectly to the main frame and engaging with the aforesaid beam or bar. If it is unyielding in its position, as it would be if the bar L' were fastened rigidly, the line of the abutment should be as low as possible, as aforesaid; but, preferably, it is not rigid, but yielding, as above described, so that when a lateral pressure is exerted upon the plow of a force between limits which can be approximately predetermined this holding device shall yield, as aforesaid. The members of this two-part holder illustrated are arranged to move vertically, one or both, so that the plow can be free as to vertical pressure at the rear end; but this also is a feature which can be modified, if desired.

It will be understood that the bar $i$, extending inward from the plow-beam, has such looseness of connection horizontally with the power-transmitting bolt or pin $I^2$ that while on the one hand said bar $I^2$ can be utilized to push the beam and plow bodily laterally into different positions which are in vertical parallelism it will not interfere with the desired amount of tilting of the beam. The spring at $I^3$ tends to hold the plow-beam down in front of the plow, its bearing being practically upon the beam, but such holding does not interfere with the rising of the plow-beam if occasion demands.

I am aware of the fact that in the aforesaid patent, No. 110,757, to Gillmore and Forrest it was proposed to tilt a plow-beam; but in that construction the tilting of the beam necessitated the tilting or rocking of the entire draft connection, the beam being arranged to rise and fall in a rocking frame connected with a stationary lever. In such a case the arc of rock is constantly varying, according as the plow-beam is higher or lower in its draft-frame, and in no two positions can the same tilting effect be attained. In my construction the tilting lever or devices are directly connected to the plow-beam and rise and fall therewith, so that they are maintained in fixed relations to the axis of tilting, which is generally a longitudinal line through the plow in or near the landside. Again, by employing this arrangement of tilting mechanism I can arrange the latter entirely independently of the draft devices and can employ means for vertically adjusting either end of the plow-beam without affecting the rocking mechanism.

When the front part of the running-gear is adjustable in the way above described, important advantages are attainable with respect to the plowing. The driver has it within his power to quickly turn the machine with the plow in either direction, so that the widths of the cut can be always maintained uniform. Thus in moving around a convex curve, if the direction of the draft of the horses be alone depended on to govern the path of the plow, the latter will tend to make a relatively wider cut at the curve; but the driver can, notwithstanding the change of direction of the horses, hold the plow properly in relation to the last furrow to maintain a uniformly wide cut; and, conversely, when making a concave curve the horses tend to draw the plow away from the land, but with the present construction this is readily obviated by the adjustment of the running-gear relative to the frame and plow-support. These features are particularly important in a machine having the frame related as described to the front wheels and the rear wheels. The left-hand rear wheel follows the plow in the newly-cut furrow, while the left-hand front wheel is following the furrow last cut, and the driver, by means of the axle-adjusting devices, can cause this front wheel to run with greater or less proximity to and pressure against the cut edge of the land to serve as an abutment to guide and steady the plow.

By having the carrier arranged on lines inclined to the longitudinal lines of the frame I obtain several advantages not attainable when it is arranged at right angles to the frame. I can thereby bring the outer end of the carrier back near the transverse lines of the rear ground-wheels, so that said end and the load of earth thereon are supported more firmly and with less strain upon the machine, said outer end being in or near the transverse lines of the widest part of the ultimate base of support; and, again, the carrier is thus arranged at an inclination to the plow also, and consequently the plowing is accomplished much more easily, for, as is well known, much less power is required if the earth escapes from the moldboard in a backward line or an inclined line than if it is thrown perpendicularly away from the plow. The lower or receiving end of the carrier is on a line several degrees remote from one parallel to the plow. Such an arrangement, however, is liable to leave an open space through which more or less earth (particularly when dry, sandy, or friable) is liable to escape; and to insure that the earth shall all be delivered from the plow to the carrier I combine with them a guide, as shown, this guide consisting of a high board or moldboard which gathers the loose material tending to roll from the plow or which has fallen near the plow when the last preceding furrow was forming. This is shown at $V^5$. It is secured to the carrier and can be moved therewith independently of the plow.

The driving devices which actuate the carrier are operated from the rear axle. $A^6$ is a sprocket-wheel mounted loosely on this axle. $A^5$ is a sliding clutch, and $A^7$ a lever extending to the operator's platform for moving the clutch. W is a sprocket-chain engaging with the wheel $A^6$ and also with the wheel $W'$ on a shaft $w$, mounted on the main frame. $W^2$ is a shaft connected to the shaft $w$ by tumbling-rod joint at $w'$. It is geared to the main driving-roller $n^{14}$ by the bevel-wheels $W^3 W^4$. The shaft, being flexibly supported, can rise or fall at its outer end to follow the carrier, but as the power-roller $n^{14}$ is upon the nonsliding or main section of the carrier this shaft $W^2$ does not need to be moved longitudinally when the carrier is lengthened.

Having above described one form of machine embodying my improvements, I now call attention to some of the numerous modifications which will readily suggest themselves.

Instead of having the rope $Q^3$ arranged and operated as shown in Figs. 1, 3, and 12 it may be taken directly up and back from the outer section Q of the carrier to roller $Q^4$ and thence down to a shaft $Q^8$, as shown in Figs. 20 to 23, this shaft being provided with a drum $Q^5$, hand-wheel $Q^6$, and ratchet-lock, the same as in Figs. 1 and 3. This shaft $Q^8$ in this modified construction also carries the spools or drums $t^6$, whereon are wound the ropes $U'$, which control the system of levers U on each side of the machine. In this construction the ropes $R'$, which govern the vertical position of the carrier as a whole, are supported and actuated as in the other construction, they being wound upon drums $R^5$ on a shaft $r^3$, (see Fig. 21,) which shaft can be rotated by the worm-wheel $R^5$, with which engages the worm $r^2$ on the shaft of hand-wheel $R^4$. In this case, again, the chain T, by which the carrier is extended, is shortened somewhat and mounted directly upon the driving-wheel $T^3$, the wheel $T^2$ (in the other construction) being here dispensed with. The power is transmitted to the chain driving-wheels $T^3$ through the vertical extensible shafting $t^3$, similar to that above described. In Fig. 23 I have also shown how mechanism can be applied for increasing the grip of the belt upon the driving-drum $n^{14}$. This mechanism consists of a lever X, which at its lower end is pivoted to an arm $x$ on the elevator-frame, link $X'$, pivoted to the lever X, and a bell-crank lever $X^2$, having one arm pivoted to the link $X'$ and the other provided with a roller $x'$, which lies under the belt. The link $X'$ has locking-teeth at $x^2$, with which engages a dog $x^3$, the lever having a thumb-latch $x^4$ for releasing it. There is a bell-crank lever like that at $X^2$ on each side of the carrier, and there may be two levers X also. When the roller $x'$ is drawn upward, the slack of the belt is taken up, and it is pressed tightly against the drum $n^{14}$, and the friction-surface is increased, so that greater driving power can be applied and the belt held taut.

Y $Y'$ designate scrapers for cleaning the carrying-belt. The scrapers are similar in construction and, as shown, are arranged near the outer and inner ends of the carrier. Each is composed of two bars secured together to form an angle the apex of which is situated about the central longitudinal line of the carrier-belt.

Each scraper is pivotally supported and is normally held against the adjacent surface of the carrier-belt by coiled springs $Y^2$. The front scraper is preferably supported from the support or hanger of the driving-drum $n^{14}$, while the rear scraper is arranged adjacent to the rear guiding-roller $n^{11}$. Each scraper is preferably held by a bar $Y^5$ below it, extending transversely of the carrier. This bar is at each end supported by a link $Y^4$, pivoted to a bar $Y^3$, which in turn is pivoted to one of the aforesaid upright bars $n^2$.

What I claim is—

1. In a grading and ditching machine, the combination, of the main supporting-frame, the plow at one side thereof, the carrier extending transversely from the plow to a point beyond the opposite side of the frame, the front ground-wheels, the rear ground-wheel on the delivery side, in the line of the preceding front wheel, and the rear ground-wheel on the plow side running outside of the line of its preceding front wheel, substantially as set forth.

2. In a grading and ditching machine, the combination, of the main frame, the plow at one side thereof, the carrier arranged transversely of the main frame and extending from the plow side to points beyond the opposite side, the rear wheel running in the line of the plow, the preceding front wheel running inside of the line of the plow, the second rear ground-wheel, and the preceding front wheel in line with the last-said rear wheel, substantially as set forth.

3. In a grading and ditching machine, the combination of the main frame, the rear axle, the rear ground-wheels, substantially equidistant from the central vertical plane of the frame, the plow at one side of the frame, the elevator extending from the plow side transversely to points beyond the opposite side, the front axle, a front ground-wheel thereon relatively near the said central vertical plane of the frame, and a second front wheel on said axle relatively farther from the frame, substantially as set forth.

4. In a grading and ditching-machine, the combination of the main supporting-frame, the rear wheels, the front wheels, the axle for the front wheels pivotally connected to the main frame, the draft devices, and means independent of the draft devices for adjusting the axle relatively to the main frame, the plow connected to the main frame, and the carrier for receiving and transporting the earth from the plow, substantially as set forth.

5. In a grading and ditching machine, the combination of the main frame, the plow connected thereto, the earth-carrier, the rear ground-wheels, the front wheels, the axle for the front wheels, the draft devices, devices independent of the draft mechanism for adjusting the line of the front axle relatively to the longitudinal lines of the machine, and means accessible to the operator for actuating said adjusting devices, substantially as set forth.

6. In a grading and ditching machine, the combination of the main frame, the plow secured thereto, the earth-carrier, the rear ground wheels, the draft devices, the front ground-wheels, the support for the last-said wheels, and means for moving one of the wheels to a transverse line in front of the transverse line of the other independently of the draft devices, substantially as set forth.

7. In a grading and ditching machine, the combination of the main frame, the plow secured thereto, the earth-carrier, the rear ground-wheels, the front ground-wheels, the support for the front wheels, the draft devices adapted to be turned laterally relative to the main frame, and means for moving one of the front ground-wheels to a transverse line in advance of the transverse line of the other, independently of the draft devices, substantially as set forth.

8. In a grading and ditching machine, the combination of the main frame, the plow secured thereto, the earth-carrier, the rear ground-wheels, the front ground-wheels, the tongue, the frame hinged to the tongue and pivotally connected to the main frame, and means for moving one of the front ground-wheels to a transverse line in advance of the transverse line of the other, and turning both to positions inclined to the longitudinal lines of the machine, independently of the tongue, substantially as set forth.

9. In a grading and ditching machine, the combination of the main frame, the plow secured thereto, the earth-carrier, the rear ground-wheels, the tongue, the laterally-vibratable frame hinged to the tongue, the ring-like connecting device interposed between the main frame and the vibrating frame and loosely connected to the latter, the front ground-wheels and the vibrating front axle between the ring-like connecting device and the vibrating tongue-frame, substantially as set forth.

10. In a grading and ditching machine, the combination of the main frame, the plow secured thereto, the earth-carrier, the rear ground-wheels, the draft devices, connected to the main frame, the front ground-wheels, the front axle, vibratable relatively to the main frame independently of the draft devices, one or more chains connected to the axle near its ends, means supported on the main frame for winding and unwinding said chain or chains, substantially as set forth.

11. In a grading and ditching machine, the combination of the wheeled supporting-frame, the plow-beam connected thereto, the plow pivoted to the beam and the yielding lock or holder permanently secured to the beam and adapted to prevent the plow from turning on said pivot until it meets with predetermined resistance, substantially as set forth.

12. In a grading and ditching machine, the combination of the wheeled frame, the plow-beam connected thereto and supported thereby, the plow pivoted to the said beam, a yielding lock or holder for the plow, supported on a pivot or a hinge, and a spring for preventing said holder from yielding until the plow exerts a predetermined pressure backward, substantially as set forth.

13. In a grading and ditching machine, the combination of the wheeled frame, the plow-beam secured thereto, the plow connected to said beam and adapted to move backward and upward to escape from the ground, a yielding lock or holder to retain the plow in operative position under ordinary pressure, and a spring for retaining said holder in its locking position and adapted to yield when the plow meets excessive resistance, substantially as set forth.

14. In a grading and ditching machine, the combination of the wheeled frame, the plow-beam connected thereto, the plow connected to the beam and adapted to move backward relatively thereto, and the toggle-like bars pivotally connected to the plow and adapted to be arranged to approximately positively lock the plow in operative position, substantially as set forth.

15. In a grading and ditching machine, the combination of the wheeled supporting-frame, the plow-beam connected thereto, the plow pivoted to the beam, the toggle-bars pivoted together and one pivoted to the beam and the other to the plow, and one or more springs connected to the toggle-bars and arranged to exert a tension upon both, across the plane of their axis of union, substantially as set forth.

16. In a grading and ditching machine, the combination of the wheeled supporting-frame, a push-beam hinged on a horizontal axis near the rear end of the supporting-frame, a plow-beam supplemental thereto, means for flexibly connecting the plow-beam to the push-beam, and means for adjusting the plow-beam independently of the push-beam, substantially as set forth.

17. The combination, in a ditching and grading machine, of the wheeled supporting-frame, the plow-beam, means for suspending the plow-beam from the main frame, and a push-beam hinged on a horizontal axis near the rear end of the main frame and adapted to rise and fall independently of the plow-beam, and means for flexibly connecting the push-beam to the plow-beam, substantially as set forth.

18. In a grading and ditching machine, the combination of the wheeled supporting-frame, the push-beam supported by a hinge near the rear end of the main frame and extending forward therefrom, the plow-beam supplemental to the push-beam, and adapted to be moved or adjusted independently thereof, and means for connecting the push-beam and the plow-beam, substantially as set forth.

19. In a grading and ditching machine, the combination of the wheeled supporting-frame, the push-beam hinged on an axis near the rear end of the main frame and extending forward therefrom, the plow-beam supplemental to the push-beam, and movable independently thereof and normally substantially parallel thereto, and means for connecting the push-beam to the plow-beam, substantially as set forth.

20. In a grading and ditching machine, the combination of the wheeled supporting-frame, the push-beam hinged on an axis near the rear end of the main frame, the plow-beam supplemental to the push-beam and connected thereto and movable independently thereof, and means for adjusting the plow-beam laterally toward and from the push-beam, substantially as set forth.

21. The combination, in a grading and ditching machine, of the wheeled supporting-frame, the plow-beam, having an inward-extending arm, a rod as at $I^2$ for imparting motion to the plow-beam, the aforesaid inwardly-extending arm being connected to the said rod and adapted to move vertically relatively thereto, and devices on the main frame for lifting the plow-beam, substantially as set forth.

22. In a grading and ditching machine, the combination of the wheeled supporting-frame, the plow-beam, means for suspending the plow-beam from the main frame, a vibratable bar or bars $I'$ connected to the main frame, devices extending to the operator's platform for vibrating the said bar, and an arm as at $i$ connecting said bar with the plow-beam, whereby the operator can move the plow bodily out or in relatively to the main frame, substantially as set forth.

23. In a grading and ditching machine, the combination of the wheeled supporting-frame, the plow-beam, having its ends adjustable vertically, and movable laterally relatively to the main frame, the geared plates as at $I^4$, $I^5$, the swinging arm or arms $I$, $I'$ connected to and actuated by said geared plates, whereby they can be adjusted laterally transversely of the frame, and means connecting the said bar or bars with the plow-beam, substantially as set forth.

24. The combination of the wheeled transporting-frame, the plow-beam connected thereto and vertically adjustable at its ends, the laterally-adjustable power-transmitting pin or rod, as at $I^2$, the arm connected to the plow-beam and extended inward therefrom and loosely connected to the said power-transmitting rod $I^2$, and the spring bearing against the inward-extending arm on the plow-beam, substantially as set forth.

25. The combination of the wheeled supporting-frame, the plow-beam connected to said frame and adjustable vertically thereon, and adapted to be rocked or tilted around longitudinal lines, a power-transmitting device connecting the plow-beam and the main frame and a spring interposed between the plow-beam and the draft-transmitting devices adapted to permit the beam and plow to rock as aforesaid, substantially as set forth.

26. The combination of the wheeled supporting-frame, the plow-beam vertically adjustable on the frame, the laterally-adjustable power-transmitting devices connecting the plow-beam to the main frame, whereby the beam may be held on lines farther from or nearer to the longitudinal center of the frame and the spring carried by said power-transmitting devices, and bearing against the plow-beam, substantially as set forth.

27. In a grading and ditching machine, the combination of the wheeled supporting-frame, the plow-beam, the push-beam, hinged at its rear end near the rear end of the main frame, and extending forward from its hinge, means for adjusting the plow-beam vertically independently of the push-beam, and a laterally-adjustable power-transmitting device connecting the push-beam with the plow-beam, substantially as set forth.

28. In a grading and ditching machine, the combination of the wheeled supporting-frame, the plow, the plow-beam flexibly supported from the main frame, and a bar or arm extending upward from the beam, by which the operator can rock or tilt the plow around longitudinal axes, while the machine is advancing, substantially as set forth.

29. In a grading and ditching machine, the combination of the wheeled supporting-frame, the plow-beam, means for adjusting the plow-beam vertically, said plow-beam being adapted to move at its rear end laterally toward and from the longitudinal center of the main frame, and a yielding holder for the plow-beam adapted to prevent such lateral movement until a predetermined pressure, laterally, has been reached, substantially as set forth.

30. In a grading and ditching machine, the combination of the wheeled supporting-frame, the vertically-adjustable plow-beam adapted to move laterally out and in relatively to the main frame, and a yielding holder for the plow-beam adapted to resist to a limited extent its lateral movements and arranged to exert a draft on the plow-beam at points relatively near the bottom of the plow, substantially as set forth.

31. In a grading and ditching machine, the combination of a wheeled supporting-frame, a vertically and laterally adjustable plow-beam, and a two-part holder for the beam adapted to resist its lateral movement, one member thereof being secured to the beam, and one connected independently thereof to the main frame, and a spring arranged to resist the yielding of the said holder under the lateral pressure of the beam, substantially as set forth.

32. In a grading and ditching machine, the combination of the main supporting-frame, the plow-beam flexibly connected to the main frame and adapted to have its rear end swing laterally relatively thereto, and a two-part holder for the beam to resist its lateral movement, one member being connected to the main frame, and the other connected to the plow, and one of said members adapted to move vertically relatively to the other, substantially as set forth.

33. The combination of the main supporting-frame, the plow-beam, connected thereto and vertically adjustable thereon, a holding-bar L' adapted to bear inward against the lateral movement of the plow, and a spring for retaining said holding-bar in normal position, substantially as set forth.

34. In a grading and ditching machine, the combination of the main supporting-frame, the plow-beam connected thereto and vertically adjustable thereon, a bar or plate L carried by the plow-beam, a roller or abutment $l$ bearing against said bar L and a yielding carrier for said abutment connected to the main frame, substantially as set forth.

35. In a grading and ditching machine, the combination of the main supporting-frame, the plow-beam connected thereto and vertically adjustable thereon and adapted to yield laterally at its rear end, and a spring interposed between the plow-beam and the main frame, and arranged to resist the lateral movement of the plow-beam until a predetermined lateral pressure thereon has been reached, substantially as set forth.

36. The combination of the main supporting-frame, the plow-beam vertically adjustable thereon and adapted to have its rear end swing laterally relatively thereto and also adapted to be tilted or rocked on longitudinal axes through the plow, a spring interposed between the plow-beam and the main frame to resist the said tilting or rocking, and a spring interposed between the beam and the main frame to resist the lateral movement of the beam, substantially as set forth.

37. The combination of the main supporting-frame, the plow-beam vertically adjustable thereon and adapted to move laterally relatively thereto, a bar or plate L secured to the plow-beam, a roller or abutment $l^2$ bearing against one side of said bar, and a roller or abutment $l$ bearing against the opposite side thereof, both of said rollers being connected to the main frame and supported thereby, and one of them being adapted to yield laterally when a predetermined pressure has been reached, substantially as set forth.

38. The combination of the main supporting-frame, the plow-beam secured thereto and vertically adjustable thereon and adapted to move out and in at its rear end relatively thereto, a roller or abutment $l^2$, arranged to receive the inward lateral pressure of the plow, a roller or abutment $l$, arranged to receive the outward lateral pressure of the plow, and a spring arranged to hold the roller or abutment $l$ in normal position until a predetermined outward lateral pressure has been reached, substantially as set forth.

39. The combination of the main supporting-frame, a rising-and-falling power beam or bar connected to the main frame, a plow-beam supplemental thereto and adapted to have its rear end rise and fall independently thereof, a vertically-yielding holder interposed between the plow-beam and the power-beam, and a laterally-yielding holder interposed between said beams, substantially as set forth.

40. The combination of the main supporting-frame, the rising-and-falling power beam or bar connected to the main frame, the plow-beam supplemental thereto and adapted to rise and fall and move laterally relatively thereto, and a two-part holder adapted to resist the lateral movement of the plow-beam, one member thereof being secured to and moving vertically with the power-beam, and the other member being secured to and moving vertically with the plow-beam, substantially as set forth.

41. In a grading and ditching machine, the combination of the main supporting-frame, the plow-beam supported thereon and vertically adjustable, and adapted to be tilted or rocked around longitudinal axes, a lever or bar secured to the plow-beam and extending upward above or toward the main frame, means for locking the lever in either of several positions, and a holder for the plow against lateral displacement situated relatively low and in the longitudinal lines of the plow, substantially as set forth.

42. In a grading and ditching machine, the combination of the main supporting-frame, the vertically-adjustable plow-beam supported from the frame and carrying the plow, said beam and plow being adapted to tilt or rock around longitudinal axes, means on the main frame for lifting the rear end of the plow, means on the main frame for lifting the front end of the plow independently of the rear end, and a lever or bar secured to and extending upward from the plow for effecting the tilting or rocking thereof while it is in operation, substantially as set forth.

43. In a grading and ditching machine, the combination of the main supporting-frame, the plow connected thereto, and adapted to rise and fall independently thereof, and a lever or bar connected to and extending upward from the plow-beam and rising and falling therewith and adapted to rock or tilt the plow relative to the frame, substantially as set forth.

44. In a grading and ditching machine, the combination of the main supporting-frame, the plow-beam, a platform or operator's support on the main frame, devices accessible to the operator while on said platform for tilting and rocking the plow while in motion, devices on the main frame for adjusting the rear end of the plow-beam vertically, and devices on the main frame for adjusting the front end of the plow vertically, independently of the rear end, substantially as set forth.

45. In a grading and ditching machine, the combination of the main supporting-frame, the plow-beam adjustable both vertically and laterally, bodily, relatively to the main frame, means for raising and lowering the plow-beam, means for moving it bodily laterally, and means accessible from above the main frame for tilting or rocking the plow on longitudinal axes while in operation, substantially as set forth.

46. In a grading and ditching machine, the combination of the main supporting-frame, the plow-beam supported thereby, lateral adjusting devices for moving the plow-beam bodily out and in relatively to the main frame, and devices independent of the said lateral adjusting devices for tilting or rocking the plow around longitudinal axes while in operation, substantially as set forth.

47. The combination of the main supporting-frame, the plow-beam adapted to rise and fall relative to the main frame and supported thereon, and the tilting lever or bar M rigidly secured to the plow-beam and extending upward to be accessible from above the main frame, substantially as set forth.

48. In a grading and ditching machine, the combination of the main supporting-frame, the plow and the carrier having a roller at the receiving end, and a roller at the delivery end, means for adjusting one of said rollers for tightening the belt, and means for moving the outer roller to either of several positions to vary the points of delivery and to elongate the load-supporting part of the belt, substantially as set forth.

49. In a grading and ditching machine, the combination of the main supporting-frame, the plow, and the carrier having a frame, an inner roller at the receiving end of the carrier, adjustable on said frame, and a roller at the outer or delivery end of said carrier, and means for moving the said outer roller to either of several distances, and a belt having two outwardly-moving portions, whereby slack is provided for elongating the load-carrying part of the belt, substantially as set forth.

50. In a grading and ditching machine, the combination of the main frame, the plow, and the carrier having an endless belt arranged to have an outward-movement load-carrying portion, and a second outward-moving, inactive portion, rollers beneath the belt at the receiving end thereof, a roller beneath the belt at the delivery end thereof, and a longitudinally-adjustable support for the last-said roll at the delivery end, substantially as set forth.

51. The combination with the main frame and the plow, of the carrier having an endless belt arranged to provide a load-carrying portion supported on one or more rollers at the receiving end and one or more rollers at the delivering end, and an inactive portion traveling continuously parallel to the load-carrying portion, an adjustable support for the roller or rollers beneath the delivery end of the load-carrying portion, and an adjustable support for the inactive portion of the belt, whereby the load-carrying portion can be elongated, and the inactive portion shortened, substantially as set forth.

52. The combination with the main frame, and the plow, of the carrier-belt having a load-carrying portion and an inactive portion, the roller under the active portion of the belt at its receiving end, the roller under the active portion at its delivery end, one or more outwardly-movable rollers for supporting the inactive portion of the belt, and means for moving outward the roller beneath the outer end of the active portion of the belt, substantially as set forth.

53. The combination with the main frame and the plow, of the carrier having the endless belt with the active portion $j$ and the inactive portion $j'$, of the rollers beneath the receiving end of the active portion, the outward movable roller under the delivery end of the active portion, a support for the inactive portion, and a driving-roller engaging with the inactive portion of the belt, substantially as set forth.

54. The combination with the main frame and the plow, of the carrier-belt having the active portion *j* and the inactive portion *j'*, the roller beneath the receiving end of the active portion, the outwardly-movable roller beneath the active portion at its delivery end, the outwardly-moving roller at the inner end of the inactive portion, and the stationary roller at the outer end of the inactive portion, substantially as set forth.

55. The combination with the main frame and the plow, of the carrier-belt having the active portion *j* and the inactive portion *j'*, the support for the inner or receiving end of the active portion, the outwardly-movable support for the delivery end of the active portion, the outwardly-movable support for the inner end of the inactive portion, the stationary roller for the outer end of the inactive portion, and means for transmitting power to the last-said roller, substantially as set forth.

56. The combination with the main supporting-frame and the plow, of a carrier-belt, a roller beneath the active or load-carrying portion of the belt, a roller beneath the outer or delivery end of the active portion, and one or more intermediate rollers movable outwardly simultaneously with the said outermost roller but with different speeds, substantially as set forth.

57. The combination with the main frame and the plow, of the carrier-belt adapted to have its active or load-carrying portion varying the position of the outer delivery end of the belt and elongated, a series of two or more relatively stationary rollers beneath the inner or receiving part of the active portion of the belt, a series of two or more rollers beneath the outer or delivery portion of the belt which are movable in relation to the first aforesaid series but are stationary relatively to each other, and a third series of intermediate rollers which are movable beneath the belt relatively to both the aforesaid series of rollers, substantially as set forth.

58. The combination with the main frame and the plow, of the carrier-belt having an active or load-carrying portion and an inactive portion, and means for varying the position of the outer delivery end of the belt and elongating the active portion of the belt without varying the tension between its receiving end and its delivery end, substantially as set forth.

59. The combination with the main frame and the plow, of the carrier having a bearing on or against the main frame, between the ends of the carrier, and provided with a carrying-belt, a roller or support for the outer end of the active or load-carrying portion of the belt, means for moving the said roller outward relatively to the aforesaid bearing, and a supplemental support for an inactive portion of the belt, substantially as set forth.

60. The combination with the main frame and the plow, of the carrier having a vertically-adjustable bearing upon or against the main frame and provided with a belt with an inactive portion and an active or load-carrying portion, situated partly inside of said bearing and partly outside thereof, a roller or support for the outer or delivery end of the active portion of the belt, and means for moving the said roller or support outward and inward relatively to the said bearing to lengthen or shorten the active portion of the belt, and simultaneously shorten or lengthen the inactive portion, substantially as set forth.

61. The combination with the main frame and the plow, of the carrier-belt and the supporting-frame for said belt having a main section, provided with a series of rollers, and a second section movable relatively to the first, and provided with a second series of rollers, and supporting devices interposed between the rollers of the second series and the main frame, and supplemental to the first frame-section, substantially as set forth.

62. In a grading and ditching machine, the combination with the main frame and the plow, of the carrier having an endless belt adapted to have its active or load-carrying portion elongated, and a supporting-frame for the said belt having a main section, a series of belt-supporting rollers on said main section, a supplemental frame-section adapted to move longitudinally of the main section and to be passed across the vertical planes of the rollers on the main section, and a second roller or series of rollers mounted on said supplemental section, substantially as set forth.

63. The combination with the main frame and the plow, of the carrier having an endless belt, a frame for the carrier formed with a main section, a roller or series of rollers supported on said main section, and a supplemental frame-section supported on and movable longitudinally of the main section and arranged to move across the vertical planes of the roller or rollers on the main section, and means independent of the main section for supporting the supplemental section from the main frame, substantially as set forth.

64. The combination with the main frame, and the plow, of the carrier having a main section, with a roller or series of rollers thereon, means for adjusting said main section vertically, a supplemental frame-section supported on and movable longitudinally of the main section and arranged to travel across the vertical planes of the roller or rollers on the main section, and means on the supplemental frame-section and movable therewith for supporting the belt, substantially as set forth.

65. The combination with the main frame and the plow, of the carrier having an endless belt, a carrier-frame having a main section, a roller or rollers on the main section to support the belt, a supplemental frame-section movable longitudinally of the main section, and one or more belt-supporting rollers on the supplemental section movable relatively to both frame-sections, substantially as set forth.

66. The combination with the main frame, and the plow, of the carrier having a traveling belt or load-supporting device, a carrier-frame having a main section, means thereon for supporting the belt, a supplemental frame-section movable longitudinally of the main section, belt-supporting devices on the supplemental frame-section, and means connected to the main frame, independently of the main carrier-frame section, for sustaining the belt-supporting devices on the supplemental frame-section, substantially as set forth.

67. The combination with the main frame, and the plow, of the carrier having a travelling belt or load-supporting device, a main carrier-frame section, a supplemental frame-section movable longitudinally of the main section, a series of belt-supporting devices on the supplemental carrier-frame section movable longitudinally thereof, and means for automatically separating and drawing together the said belt-supporting devices, substantially as set forth.

68. The combination with the main frame, and the plow, of a carrier having an endless belt arranged to provide an active or load-carrying portion, $j$, and an inactive portion, as at $j'$, a main carrier-frame section, a supplemental carrier-frame section movable longitudinally of the main section, and a support for the inactive portion of the belt mounted upon and traveling with the said supplemental frame-section, substantially as set forth.

69. The combination with the main frame, and the plow, of the carrier-belt, and a frame or support for the belt having an inner or main section and an outer section at the delivery end of the belt which is adjustable longitudinally on and vertically independently of the inner section, substantially as set forth.

70. The combination with the main frame, and the plow, of the carrier-belt, the frame or support therefor having a main or inner section, a series of rollers thereon, a supplemental section between the plow and the main section and movable relatively thereto, and a third section at the delivery end of the belt adjustable vertically relatively to the main section, substantially as set forth.

71. The combination with the main frame, and the plow, of the carrier-belt, the frame or support therefor having a main section, a supplemental section between the plow and the main section and movable relatively thereto, and a third section at the delivery end of the belt which is movable both longitudinally and vertically relatively to the main section, substantially as set forth.

72. The combination with the main frame, and the plow, of the carrier frame or support having a main section, means for supporting said section at its outer end from the main frame, means for supporting it at its inner end from the main frame, a supplemental frame-section movable across the vertical planes of the connection of the supporting devices with the outer end of the main section and the single carrier-belt extended continuously around said main section and said supplemental section, substantially as set forth.

73. The combination with the main frame, and the plow, of the carrier-belt, the frame or support therefor having the main or inner section supported from the main frame, and an outer section for the delivery end of the belt movable toward and from the main frame, supplemental devices for supporting said outer movable section from the main frame, and means for holding the belt uniformly taut, independently of the position of the outer end thereof, substantially as set forth.

74. The combination with the main frame, and the plow, of the carrier-belt, and the frame or support therefor having a main section provided with a bearing on or against the main frame on a transverse line between the ends of said main section, a supplemental frame-section for the delivery end of the belt movable outwardly from and toward the said bearing, and means for holding the belt uniformly taut independently of the position of the supplemental frame-section, substantially as set forth.

75. The combination with the main frame, and the plow, of the carrier-belt, and the frame therefor having the main section provided with a bearing on or against the main frame, means for vertically supporting said section at points inside of said bearing, means for supporting said section from the main frame at points outside of said bearing, and a supplemental frame-section adjustable longitudinally of the main section and movable across the vertical plane of the aforesaid supporting devices outside of said bearing, substantially as set forth.

76. The combination with the main frame, and the plow, of the carrier-belt having a roller or support for the receiving part adjacent to the plow, and a roller or support at the place of delivery, means for adjusting the distance between the said rollers or supports to vary the tension of the belt, and means supplemental to those aforesaid for varying the distance between the said rollers or supports to elongate or shorten the active or load-carrying portion of the belt, substantially as set forth.

77. The combination with the main frame, and the plow, of the carrier-belt, and the frame or support therefor having a main section, a supplemental or second section adapted to move longitudinally of the main section, and a third section at the delivery end of the belt movable longitudinally of the main section, and vertically adjustable relatively to both the first and the second sections, substantially as set forth.

78. The combination with the main frame, and the plow, of the carrier-belt, and the frame or support therefor having a main section, and a supplemental section movable longitudinally of the main section, and one or more belt-supporting rollers on the supplemental section, devices for automatically adjusting said rollers to differing distances from each other, and means for moving the supplemental frame-section and connected to the roller-adjusting devices, substantially as set forth.

79. The combination with the main frame and the plow, of the carrier-belt, and the frame or support therefor having a main section, a supplemental frame-section movable longitudinally of the main section, a series of two or more belt-supporting rollers on the supplemental section, and a system of lazy-tong levers connected to the said rollers for moving or spacing them when the supplemental frame-section is moving, substantially as set forth.

80. The combination with the main frame, and the plow, of the carrier-belt, and the frame or support therefor having a roller for the receiving part of the belt adjacent to the plow and a roller at the delivery part of the belt, means for increasing the distance between the two said rollers, a series of two or more belt-supporting rollers between the two aforesaid, and a system of lazy-tong levers connected to the rollers of the said series and adapted to move or space them when the distance between the extreme rollers is being varied, substantially as set forth.

81. The combination with the main frame, and the plow, of the carrier, the frame or support therefor having a bearing on or against the main frame and extended to points outside of the said bearing, a lever, as at $u^3$, bearing against the main frame at points inside of the aforesaid bearing of the carrier-frame, means connecting the said lever to that part of the carrier-frame outside of the said bearing, and adjustable draft devices connecting the upper end of said lever to the main frame, substantially as set forth.

82. The combination with the main frame, and the plow, of the carrier-belt, the frame or support therefor having a bearing upon or against the main frame, and extending to points outside of said bearing, a lever or bar, as at $u^3$, arranged to bear upon the main frame at points inside of the aforesaid bearing of the carrier-frame, a connection, $u$, between said lever or bar and the outwardly-projecting part of the carrier-frame, and draft devices on the main frame connected to said lever or bar, substantially as set forth.

83. The combination with the main frame, and the plow, of the carrier-belt, the frame or support therefor having a thrust-bearing upon or against the main frame, a lever or bar arranged to have a thrust upon the main frame at points inside of the aforesaid bearing, outwardly-adjustable connecting devices for joining said lever or bar to that part of the carrier-frame which projects outward from the said bearing, and draft devices connecting the said lever or bar to the main frame, substantially as set forth.

84. The combination with the main frame, and the plow, of the carrier-belt, a frame or support therefor, a series of belt-supporting rollers, devices for moving one end of one or more of the rollers for increasing the tension of one side of the belt independently of the other side, and means extending to the operator's platform on the main frame for moving said adjusting devices, substantially as set forth.

85. The combination with the main frame, and the plow, of the carrier-belt, the frame or support therefor, the series of belt-supporting rollers on said frame, means controllable from the main frame and at one side of the elevator-belt for moving the end or ends of one or more of the rollers at that side of the belt, to vary the tension of said side independently of the other, and a supplemental set of devices controllable from the main frame at the opposite side of the belt for moving one end of a roller or rollers independently of the opposite end, substantially as set forth.

86. The combination with the main frame and the platform, of the elevator-belt having an active or load-carrying portion and a surplus inactive portion, a frame formed in two parts, of which one is adapted to be moved longitudinally of the other, means controllable by the operator from the main frame for positively moving the movable part in one direction to elongate the active portion of the belt, and also positively moving it in the opposite direction to shorten said active portion and means for adjusting vertically the entire elevator bodily, substantially as set forth.

87. The combination with the main frame, and the plow, of the carrier-belt, and the frame therefor, formed in two sections of which one is movable longitudinally of the other, the chain connected to the movable section, the rotary chain-driving device mounted on the other section, and means for actuating said chain-driving device, substantially as set forth.

88. The combination with the main frame, and the plow, of the carrier-belt, the carrier frame or support having a main section adjacent to the main frame, and an outer section at the delivery part of the carrier-belt and movable from and toward the main frame, a carrier-belt extending longitudinally, continuously around both the inner section and the outer movable section and a driving drum or wheel engaging with the belt and mounted on the inner frame-section, substantially as set forth.

89. In a grading and ditching machine, the combination with the plow, and the main frame, of the carrier having an endless belt, a vertically-adjustable driving-drum engaging with the belt, a roller, a vertically-adjustable roller adjacent to the driving-drum, means extending to the operator's platform for adjusting said roller vertically, whereby the tightness and extent of the belt upon the drum can be varied and a vertically-movable support for the adjusting devices substantially as set forth.

90. In a grading and ditching machine, the combination of the main frame, the plow, the longitudinally-extensible elevator having its lower end supported on a roller which is inclined to the path of the plow, and an earth-guide or moldboard vertically adjustable independently of the plow and arranged in the angle between said plow and said roller, substantially as set forth.

91. In a ditching and grading machine, the combination of the main frame, the draft devices, means independent of the draft devices for guiding the main frame, the plow, the rear wheels of which one is in the line of the plow, and the front wheels of which one is arranged to be turned toward or from the unplowed land, substantially as set forth.

92. In a ditching and grading machine, the combination of the main frame, the plow, the carrier, the scraper arranged below the operative surface of the return part of the carrier near its end, and yielding devices for supporting the scraper, substantially as set forth.

In testimony whereof I affix my signature in presence of two witnesses.

CLEMENT F. HINMAN.

Witnesses:
ARTHUR R. DURKEE,
FRANK R. PIPER.